United States Patent
Kwon

(10) Patent No.: US 11,902,866 B2
(45) Date of Patent: Feb. 13, 2024

(54) APPARATUS AND METHOD FOR PERFORMING WIRELESS COMMUNICATION IN WIRELESS COMMUNICATION SYSTEM SUPPORTING VEHICLE COMMUNICATION

(71) Applicant: Innovative Technology Lab Co., Ltd., Seoul (KR)

(72) Inventor: Ki Bum Kwon, Seoul (KR)

(73) Assignee: INNOVATIVE TECHNOLOGY LAB CO., LTD., Seoul (KR)

( * ) Notice: Subject to any disclaimer, the term of this patent is extended or adjusted under 35 U.S.C. 154(b) by 914 days.

(21) Appl. No.: 16/194,218

(22) Filed: Nov. 16, 2018

(65) Prior Publication Data
US 2019/0158993 A1    May 23, 2019

(30) Foreign Application Priority Data

Nov. 17, 2017    (KR) .................. 10-2017-0153778
Feb. 12, 2018    (KR) .................. 10-2018-0016808

(51) Int. Cl.
*H04W 4/44*    (2018.01)
*H04W 4/70*    (2018.01)
(Continued)

(52) U.S. Cl.
CPC .............. *H04W 4/44* (2018.02); *H04L 5/001* (2013.01); *H04L 5/0032* (2013.01);
(Continued)

(58) Field of Classification Search
CPC ......... H04L 1/08; H04L 1/189; H04L 5/0053; H04L 1/1867; H04L 1/1893;
(Continued)

(56) References Cited

U.S. PATENT DOCUMENTS

2004/0062248 A1    4/2004 Nagarajan et al.
2011/0087943 A1    4/2011 Mangione-Smith et al.
(Continued)

OTHER PUBLICATIONS

International Search Report(PCT/KR2018/014160).
(Continued)

*Primary Examiner* — Joseph E Avellino
*Assistant Examiner* — Mon Cheri S Davenport

(57) ABSTRACT

Provided is a method for determining and performing a packet duplication transmission between wireless devices. The method comprises receiving, from an evolved NodeB (eNB), configuration information associated a packet duplication transmission between wireless devices, wherein the configuration information comprising a packet reliability parameter associated with activation of the packet duplication transmission between wireless devices; determining, by a first wireless device, a data packet to be transmitted to a second wireless device; duplicating, based on determining the data packet satisfies the packet reliability parameter, the data packet to a plurality of data duplicates; mapping the plurality of data duplicates onto different logical channels in a media access channel (MAC) layer; and transmitting, by the first wireless device and via a direct communication to a second wireless device, the plurality of data duplicates mapped onto different logical channels.

23 Claims, 18 Drawing Sheets

(51) Int. Cl.
  *H04L 5/00* (2006.01)
  *H04W 76/27* (2018.01)
  *H04W 4/46* (2018.01)
  *H04W 80/02* (2009.01)
(52) U.S. Cl.
  CPC ............. *H04L 5/0091* (2013.01); *H04W 4/46* (2018.02); *H04W 4/70* (2018.02); *H04W 76/27* (2018.02); *H04W 80/02* (2013.01)
(58) Field of Classification Search
  CPC ............. H04L 2001/0096; H04L 5/001; H04L 1/0013; H04L 1/1812; H04L 1/1819; H04L 1/1825; H04L 47/32; H04L 47/33; H04L 69/324; H04W 76/27; H04W 28/06; H04W 72/0406; H04W 76/14; H04W 4/40; H04W 4/44; H04W 4/46; H04W 72/02; H04W 72/042; H04W 72/0453; H04W 74/0808; H04W 80/10; H04W 88/04; H04W 8/22
  See application file for complete search history.

(56) References Cited

U.S. PATENT DOCUMENTS

| | | | |
|---|---|---|---|
| 2015/0181638 A1* | 6/2015 | Tabet ................. | H04W 28/085 370/228 |
| 2018/0103394 A1* | 4/2018 | Gholmieh ............... | H04L 47/32 |
| 2018/0324642 A1* | 11/2018 | Yu ......................... | H04L 1/1835 |
| 2018/0368107 A1* | 12/2018 | Babaei ................ | H04L 27/2608 |
| 2019/0215685 A1* | 7/2019 | Wang ..................... | H04W 4/40 |
| 2019/0268799 A1* | 8/2019 | Hong ................ | H04W 28/0278 |

OTHER PUBLICATIONS

Written Opinion of the International Searching Authority(PCT/KR2018/014160).

"3rd Generation Partnership Project; Technical Specification Group Radio Access Network; Evolved Universal Terrestrial Radio Access (E-UTRA); Packet Data Convergence Protocol (PDCP) specification (Release 14)," 3GPP TS 36.323 V14.4.0, Sep. 2017, 3GPP Organizational Partners.

"3rd Generation Partnership Project; Technical Specification Group Radio Access Network; Evolved Universal Terrestrial Radio Access (E-UTRA); Medium Access Control (MAC) protocol specification (Release 14)," 3GPP TS 36.321 V14.4.0, Sep. 2017, 3GPP Organizational Partners.

"3rd Generation Partnership Project; Technical Specification Group Radio Access Network; Evolved Universal Terrestrial Radio Access (E-UTRA); Radio Resource Control (RRC) protocol specification (Release 14)," 3GPP TS 36.331 V14.4.0, Sep. 2017, 3GPP Organizational Partners.

Qualcomm Incorporated et al., "Carrier Aggregation Use Cases in V2X Phase 2", 3GPP TSG RAN WG2 Meeting #99bis R2-1710685, Prague, Czechia, Oct. 9-13, 2017, pp. 1-3.

Huawei (rapporteur), "Summary of [99#48][eV2X] Selection of Tx carriers", 3GPP TSG-RAN WG2 Meeting #99bis R2-1710089, Prague, Czech Republic, Oct. 9-13, 2017, pp. 1-26.

International Search Report(PCT/KR2018/014160), dated 2018.

Written Opinion of the International Searching Authority(PCT/KR2018/014160), dated 2018.

Notification of Transmittal of the International Search Report and the Written Opinion of the International Searching Authority, or the Declaration(PCT/KR2018/014160).

3GPP TSG-RAN WG2 Meeting #99bis R2-1711013 Prague, Czech, Oct. 9-13, 2017. "Discussion on Data Duplication for PC5 CA". ZTE.

3GPP TSG-RAN WG2 #99bis R2-1710304 Prague, Czech Republic, Oct. 9-13, 2017. "Duplication activation/deactivation MAC CE". CATT.

3GPP TSG-RAN WG2 Meeting #NR AH2 R2-1706372 Qingdao, China, Jun. 27-29, 2017. "Impact of PDCP duplication on MAC". CATT.

* cited by examiner

APPARATUS AND METHOD FOR PERFORMING WIRELESS COMMUNICATION IN WIRELESS COMMUNICATION SYSTEM SUPPORTING VEHICLE COMMUNICATION

CROSS-REFERENCE TO RELATED APPLICATIONS

This application claims priority from and the benefit of Korean Patent Application Nos. 10-2017-0153778, filed on Nov. 17, 2017, and 10-2018-0016808, filed on Feb. 12, 2018, each of which is hereby incorporated by reference in its entirety.

BACKGROUND

1. Field

The present disclosure relates to wireless communication, and more particularly, to a method and apparatus for performing wireless communication in a wireless communication system that supports vehicle communication.

2. Discussion of the Background

V2X communication is a communication scheme that communicates with road infrastructures and other vehicles, and exchanges and shares information such as traffic conditions or the like, during driving a vehicle. V2X may include vehicle-to-vehicle (V2V) indicating LTE-based communication between vehicles, vehicle-to-pedestrian (V2P) indicating LTE-based communication between a vehicle and a terminal carried by a person, and vehicle-to-infrastructure/network (V2I/N) indicating LTE-based communication between a vehicle and a roadside unit (RSU)/network. In this instance, the road side unit (RSU) may be a transportation infrastructure entity embodied by a fixed terminal or a base station. For example, it may be an entity that transmits a speed notification to a vehicle.

Detailed technologies that the LTE system additionally requires are currently under discussion based on the performance requirements of the 5G system for supporting V2X, such as autonomous driving, a vehicle remote control, or the like. Therefore, there is a desire for a resource control method of an eNB and an operation method of a user equipment (UE) corresponding thereto, in order to efficiently support duplicated data transmission for a vehicle communication service which requires high reliability.

SUMMARY

According to an aspect of the present disclosure, there is provided a wireless communication method performed by a user equipment (UE) in a wireless communication system that supports vehicle communication (Vehicle to Everything: V2X).

The method may include: receiving, from an evolved NodeB (eNB), carrier configuration information associated with at least one carrier used for V2X communication that supports carrier aggregation (CA); configuring the at least one carrier for the UE; receiving, from the eNB, V2X configuration information including information associated with a transmission resource pool used for the V2X communication; configuring the transmission resource pool based on the V2X configuration information; and controlling a resource used for the V2X communication, based on a mode.

According to an aspect of the present disclosure, the mode includes a mode (mode 3) in which the eNB controls the resource used for the V2X communication and a mode (mode 4) in which the UE controls the resource, the mode is applied for each UE or for each carrier, and when the mode is applied for each carrier, information associated with a transmission resource pool which is different for each carrier is received from the eNB.

According to another aspect of the present disclosure, when the mode is applied for each UE, the same mode is applied to all carriers configured for the UE, and applying mode 4 to a carrier additionally configurable for the UE is permitted.

According to another aspect of the present disclosure, the method may further include: receiving, from the eNB, indication information associated with whether applying mode 4 is permitted.

According to another aspect of the present disclosure, the method may further include: receiving, from the eNB, information indicating permission or nonpermission of a scheme that duplicately transmits the same packet in the V2X communication (hereinafter, duplicated packet transmission), and information including a parameter associated with activation of the duplicated packet transmission.

According to another aspect of the present disclosure, when different modes are applied to carriers configured for the UE, the method may further include: performing the duplicated packet transmission within a delay time in which the duplicated packet transmission is permitted.

According to another aspect of the present disclosure, when mode 3 is applied to carriers configured for the UE, the method may further include: transmitting, to the eNB, MAC data indicating activation of the duplicated packet transmission.

An example method comprises receiving, from an evolved NodeB (eNB), configuration information associated a packet duplication transmission between wireless devices, wherein the configuration information comprising a packet reliability parameter associated with activation of the packet duplication transmission between wireless devices; determining, by a first wireless device, a data packet to be transmitted to a second wireless device; duplicating, based on determining the data packet satisfies the packet reliability parameter, the data packet to a plurality of data duplicates; mapping the plurality of data duplicates onto different logical channels in a media access channel (MAC) layer; and transmitting, by the first wireless device and via a direct communication to a second wireless device, the plurality of data duplicates mapped onto different logical channels.

An example method comprises receiving, from an evolved NodeB (eNB), configuration information associated a packet duplication transmission between wireless devices, wherein the configuration information comprising a packet reliability parameter associated with activation of the packet duplication transmission between wireless devices; receiving, by a first wireless device and via a direct communication from a second wireless device, a plurality of data duplicates mapped onto different logical channels; determining, based on the different logical channels, the plurality of data duplicates, wherein the plurality of data duplicates are associated with a same sequence number; storing, based on the same sequence number, one of the plurality of data duplicates; and discarding, after the storing, remaining data duplicates of the plurality of data duplicates.

DETAILED DESCRIPTION OF THE ILLUSTRATED EMBODIMENTS

Figure 1:
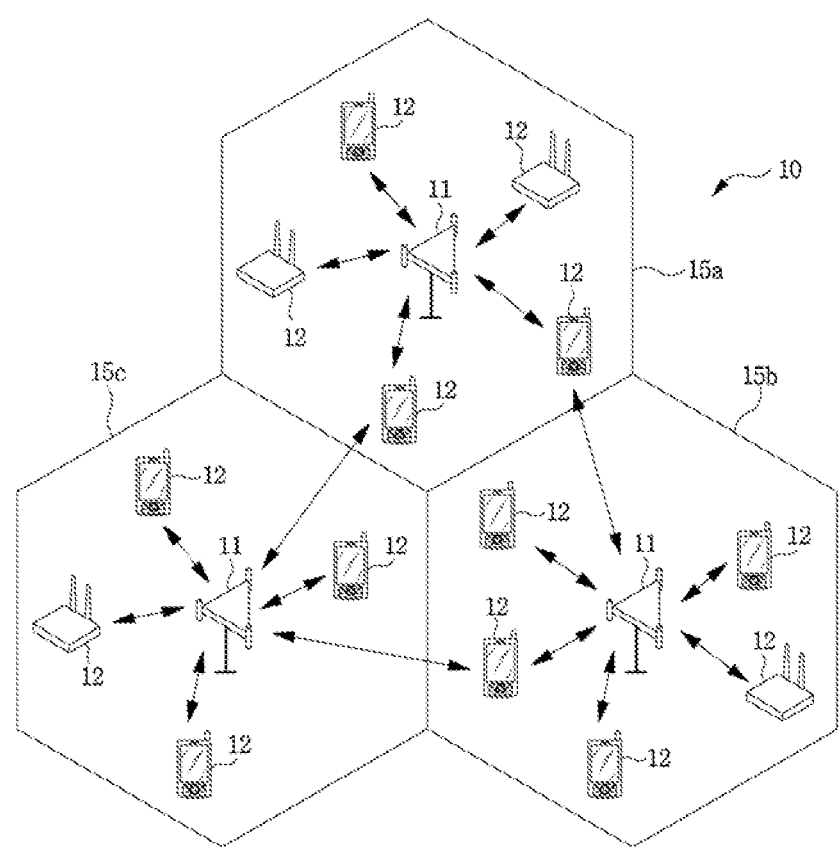
FIG. 1 is a diagram illustrating a wireless communication system to which the present disclosure is applied.

Various examples will be described more fully hereinafter with reference to the accompanying drawings. Throughout the drawings and the detailed description, unless otherwise described, the same drawing reference numerals are understood to refer to the same elements, features, and structures. In describing the examples, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present. In contrast, when an element is referred to as being "directly on," "directly connected to" or "directly coupled to" another element, there are no intervening elements present.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention. When an embodiment is embodied as software, the described scheme may be embodied as a module (process, function, or the like) that executes the described function. The module may be stored in a memory and may be executed by a processor. The memory may be disposed inside or outside the processor and may be connected to the processor through various well-known means.

Further, the description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, eNodeB (eNB), gNodeB (gNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

Herein, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

In the following description, a system to which various examples of the present disclosure are applied may be referred to as a New Radio (NR) system to be distinguished from other existing systems. The NR system may include one or more features defined by TS38 series of the third partnership project (3GPP) specification. However, the scope of the present disclosure is not limited thereto or restricted thereby. In addition, although the term 'NR system' is used herein as an example of a wireless communication system capable of supporting a variety of subcarrier spacings (SCSs), the term 'NR system' is not limited to the wireless communication system for supporting a plurality of subcarrier spacings.

FIG. 1 is a diagram illustrating a wireless communication system to which the present disclosure is applied.

The network structure illustrated in FIG. 1 may be the network structure of Evolved-Universal Mobile Telecommunications System (E-UMTS). E-UMTS may include the long term evolution (LTE) system, the LTE-A system, or the like, or may include the 5G mobile communication network, new radio (NR), or the like.

Referring to FIG. 1, in a wireless communication system 10, a base station (BS) 11 and a user equipment (UE) 12 may wirelessly perform transmission and reception of data. Also, the wireless communication system 10 may support device-to-device (D2D) communication between UEs. Hereinafter, a UE includes all concepts of terminal devices used by general users, such as a smart phone and the like, and terminal devices installed in vehicles. D2D communication in the wireless communication system will be described later.

The BS 11 in the wireless communication system 10 may provide a communication service to a UE existing in the coverage of the BS 11 via a predetermined frequency band. The coverage within which a BS provides a service is also referred to as a site. The site may include various areas 15a, 15b, and 15c, which may be referred to as sectors. The sectors included in the site may be identified by different identifiers. Each sector 15a, 15b, and 15c may be construed as a part of the area that the BS 11 covers.

The BS 11 may generally refer to a station that communicates with the UE 12, and may be referred to as an evolved-NodeB (eNodeB), a base transceiver system (BTS), an access point, a femtoeNodeB, a home eNodeB (HeNodeB), a relay, a remote radio head (RRH), or the like.

The UE 12 may be a stationary or mobile entity, and may be referred to as a mobile station (MS), a mobile terminal (MT), a user terminal (UT), a subscriber station (SS), a wireless device, a personal digital assistant (PDA), a wireless modem, a handheld device, or the like.

Also, the BS 11 may be called by various names, such as "megacell", "macrocell", "microcell", "picocell", "femtocell", or the like based on the size of coverage provided by the corresponding BS. A cell may be used as a term for indicating a frequency band that a BS provides, the coverage of a BS, or a BS.

Hereinafter, a downlink (DL) indicates communication or a communication path from the BS 11 to the UE 12, and an uplink (UL) indicates communication or a communication path from the UE 12 to the BS 11. In the downlink, a transmitter may be a part of the BS 11, and a receiver may be a part of the UE 12. In the uplink, a transmitter may be a part of the UE 12, and a receiver may be a part of the BS 11.

A multiple access scheme applied to the wireless communication system 10 is not limited. For example, the wireless communication system may utilize varied multiple access schemes, such as code division multiple access (CDMA), time division multiple access (TDMA), frequency division multiple access (FDMA), orthogonal frequency division multiple access (OFDMA), single carrier-FDMA (SC-FDMA), OFDM-FDMA, OFDM-TDMA, OFDM-CDMA, and the like. Uplink transmission and downlink transmission may be performed based on a time division duplex (TDD) scheme that performs transmission at different times, or based on a frequency division duplex (FDD) scheme that performs transmission at different frequencies.

Hereinafter, terms used in the present specification will be defined.

V2X indicates V2V, V2P, and V2I/N, and, in association with wireless communication such as LTE, each will be defined as follows.

V2V (vehicle-to-vehicle): cover LTE-based communication between vehicles

V2P (vehicle-to-pedestrian): cover LTE-based communication between a vehicle and a device carried by an individual (e.g., a portable terminal carried by a pedestrian, a cyclist, a driver, or passenger).

V2I/N (vehicle-to-infrastructure/network): cover LTE-based communication between a vehicle and a road side unit/network, wherein the road side unit (RSU) is a transport infrastructure entity (entity that transmits speed notification) implemented by an eNB or a stationary UE. Among them, in order to perform V2V that is based on PC5, which is a D2D communication link, various scenarios as below are currently considered.

TABLE 1

| Aspect No. | Case No. | Note |
| --- | --- | --- |
| Aspect 1 (operation bands used as test points for evaluation) | Case 1A | For Case 1A, 6 HGz is used. For Case 1B, 2 GHz is used. Case 1B may not be need to be specifically simulated for all scenarios. |
| | Case 1B | |
| Aspect 2 (eNB deployment consideration including possibility of network control. it is necessary to consider the condition to apply any preconfigured radio parameters) | Case 2A | UE autonomous resource allocation, at least mode 2, based on semi-statically network-configured/pre-configured radio parameters including no eNB coverage case. |
| | Case 2B | eNBs providing more UE specific or/and more dynamic resource allocation including Mode 1 compared to case 2A. |
| Aspect 3 | Case 3A | UEs communicating over PC5 across a single carrier. |
| | Case 3B | UEs communicating over PC5 across multiple carriers. |
| Aspect 4 | Case 4A | Single operator operation |
| | Case 4B | A set of PC5 operation carrier(s) is shared by UEs subscribed to different operators. This means that UEs belonging to different operators may transmit on the same carrier. |
| | Case 4C | Each operator is allocated with a different carrier. This means that a UE transmits only on the carrier allocated to the operator which it belongs to. |
| | Case 4D | No operator operation |

TABLE 1-continued

| Aspect No. | Case No. | Note |
|---|---|---|
| Aspect 5 (Co-existing with Uu) | Case 5A | Dedicated carrier for V2x. There is no uplink (Uu) traffic on the PC5 operation carrier. |
| | Case 5B | V2x carrier is shared with Uu. |

The PC5 link indicates an interface defined between UEs, and may be defined as a sidelink (SL) in a radio access layer. The sidelink indicates a link in a radio access layer for direct communication between vehicles for vehicle communication, but it is not limited thereto.

The abbreviations used in the present specification are listed as below.

TABLE 2

D2D: Device to Device (communication)
ProSe: (Device to Device) Proximity Services
V2X: Vehicle to X(everything)
V2V: Vehicle to Vehicle
V2P : Vehicle to Pedestrian
V2I/N: Vehicle to Infrastructure/Network
GNSS: Global Navigation Satellite System
RSU: Road Side Unit
SL: Sidelink
SCI: Sidelink Control Information
PSSCH: Physical Sidelink Shared Channel
PSBCH: Physical Sidelink Broadcast Channel
PSCCH: Physical Sidelink Control Channel
PSDCH: Physical Sidelink Discovery Channel
PDCP: Packet data com
RLC: Radio link Control
MAC: Media Access Control FIG. 2 is a diagram illustrating a link that V2X uses according to an embodiment.

Figure 2:
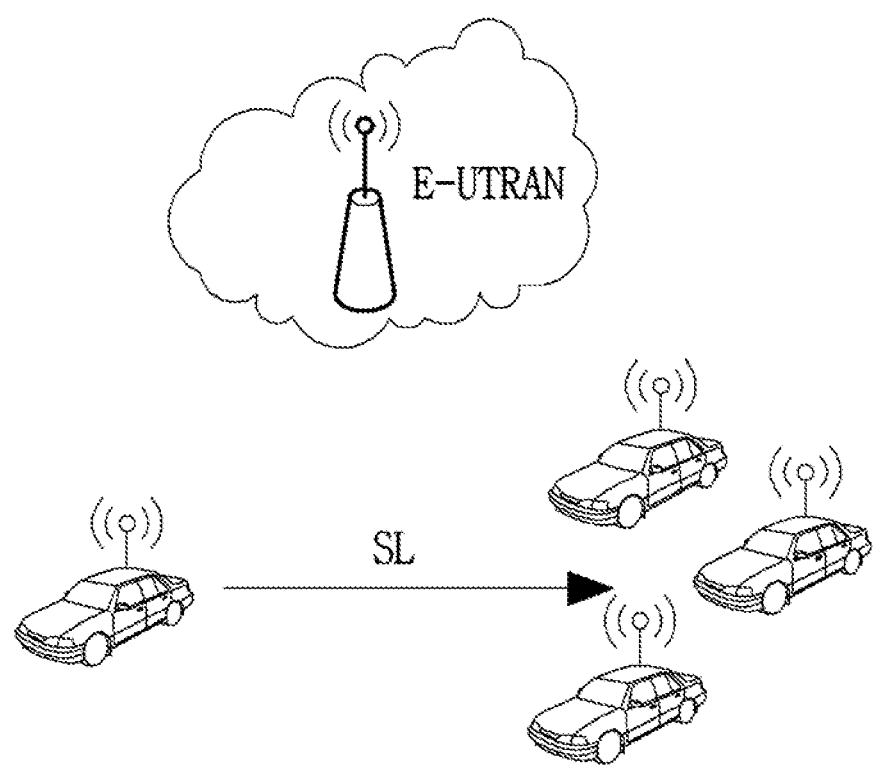
FIG. 2 is a diagram illustrating a link that V2X uses according to an embodiment.

Referring to FIG. 2, a communication system that supports V2X may support only a PC5 link, which is a link between UEs defined in D2D (or ProSe).

Figure 3:
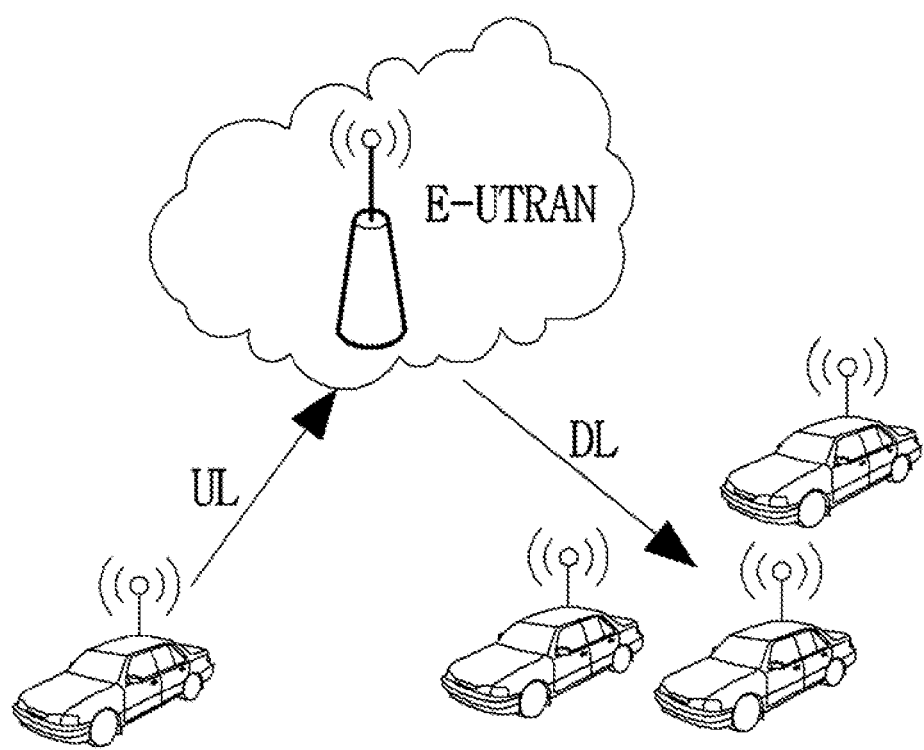
FIG. 3 is a diagram illustrating a link that V2X uses according to another embodiment.

FIG. 3 is a diagram illustrating a link that V2X uses according to another embodiment.

Referring to FIG. 3, a communication system that supports V2X may support only a Uu link, which is a link between an eNB and a UE, or a link between an E-UTRAN and a UE. The Uu link may include an uplink (UL) that is a path in which a UE transmits a signal to an eNB, and a downlink (DL) that is a path in which an eNB transmits a signal to a UE.

Figure 4A:
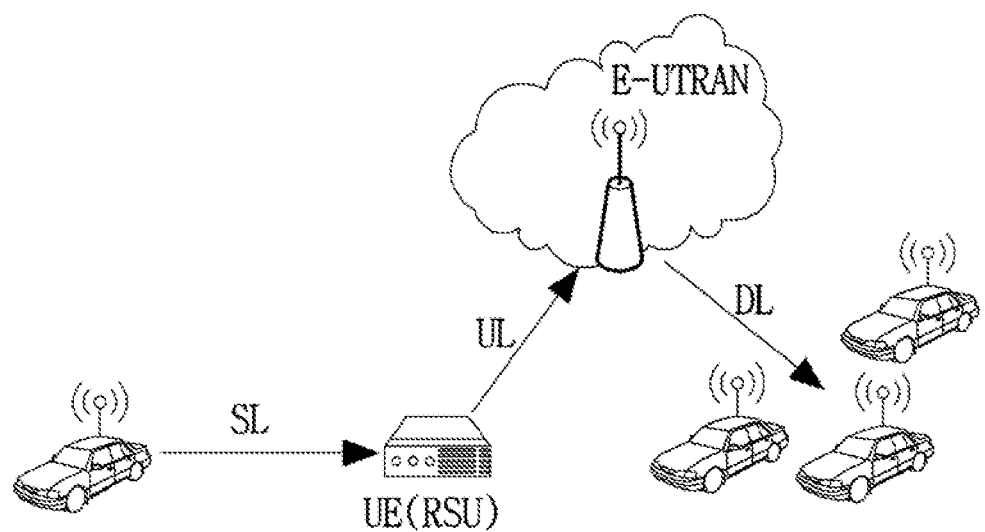
FIG. 4A is a diagram illustrating the case in which an eNB transmits a downlink signal to a plurality of vehicles.
Figure 4B:
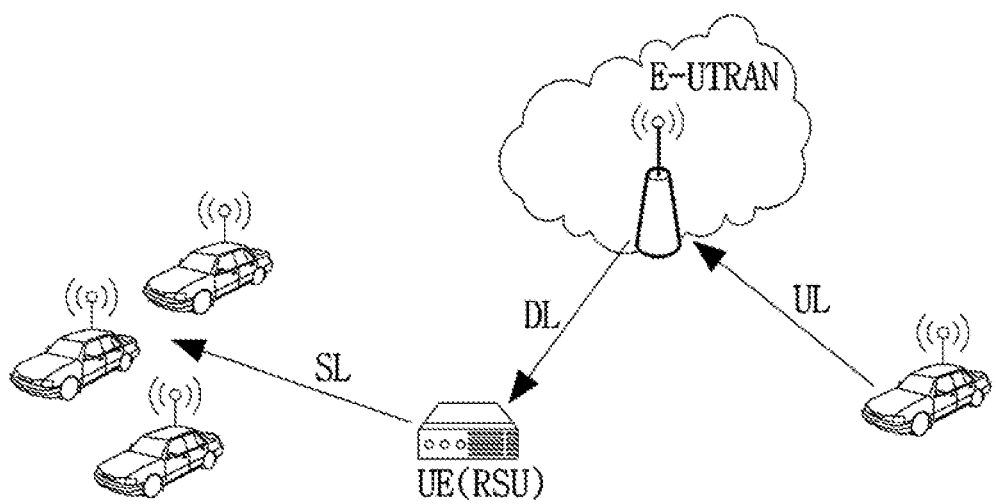
FIG. 4B is a diagram illustrating the case in which a user equipment (UE or RSU) transmits a sidelink signal to a plurality of vehicles.

FIGS. 4A and 4B are diagrams illustrating links that V2X uses according to another embodiment.

Referring to FIGS. 4A and 4B, V2X may use both the PC5 link and the Uu link by including a road side unit (RSU) in the form of a UE. FIG. 4A illustrates the case in which an eNB transmits a downlink signal to a plurality of vehicles, and FIG. 4B illustrates the case in which a UE (RSU) transmits a sidelink signal to a plurality of vehicles.

D2D communication refers to a technology in which UEs directly transmit and receive data. Hereinafter, it is assumed that a UE supports D2D communication. Also, D2D communication may be interchangeably used with an expression, proximity based service (ProSe) or ProSe-D2D communication. The use of the term "ProSe" for D2D communication may not change the meaning of direct data transmission/reception between UEs, but may add the meaning of a proximity-based service.

D2D communication performs: a discovery process for communication between UEs existing in a network coverage (in-coverage) or outside the coverage (out-of-coverage); and a direct communication process for transmitting and receiving control data and/or traffic data between UEs. Hereinafter, a UE that transmits a signal based on D2D communication is referred to as a transmission UE (Tx UE), and a UE that receives a signal based on D2D communication is referred to as a reception UE (Rx UE). The Tx UE may transmit a discovery signal, and the Rx UE may receive a discovery signal. The Tx UE and the Rx UE may exchange their roles. A signal transmitted by the Tx UE may be received by two or more Rx UEs.

The D2D communication may be used for various purposes. For example, D2D communication in the commercial-frequency-based network coverage may be used for public safety, traffic network services, ultra-low latency services, commercial-purpose services, and the like. However, D2D communication based on a traffic network-dedicated frequency may be used only for traffic network communication, traffic safety, and the like, irrespective of network coverage.

When UEs located close to each other perform D2D communication in a cellular system, loads on an eNB may be dispersed. Also, when UEs located close to one another perform D2D communication, the UEs transmit data within a relatively short distance and thus, the transmission power consumption and transmission latency of the UEs may be balanced. In addition, from the perspective of the whole system, the existing cellular-based communication and the D2D communication use the same resources and thus, frequency usage efficiency may be improved when they do not overlap spatially.

D2D communication may be classified into communication between UEs in network coverage (or eNB coverage) (in-coverage), communication between UEs outside the coverage (out-of-coverage), and communication between a UE in the network coverage and a UE outside the network coverage.

An eNB schedules resources required when in-coverage UEs transmit data via a sidelink for D2D communication in a wireless communication system. In this instance, the in-coverage UEs may report the amount of data (e.g., D2D data), which exists in a buffer of each UE and is to be transmitted through a sidelink, to the eNB through a buffer status report (BSR). The BSR for a sidelink may be referred to as a sidelink BSR (SL BSR) or proximity service (ProSe) BSR, in order to distinguish the same from a BSR for a wide area network (WAN). Although it is similar to D2D, a BSR specialized for D2D for V2X may be separately defined, in order to distinguish the same from the SL from the perspective of a service. In this instance, the BSR may be referred to as V2X BSR.

The eNB may transmit D2D resource allocation information to a first UE (UE1) located in the coverage of the eNB. The D2D resource allocation information may include allocation information associated with a transmission resource and/or a reception resource, which may be used for D2D communication between the first UE and another UE. The first UE that receives the D2D resource allocation information from the eNB may transmit, to the other UE, the D2D resource allocation information associated with a D2D resource through which the D2D data is to be transmitted so that the other UE may receive the D2D data transmitted by the first UE.

The first UE (UE1), a second UE (UE2), a third UE (UE3), and/or a fourth UE (UE4) may perform D2D communication based on the D2D resource allocation information. Particularly, the second UE, the third UE, and/or the fourth UE may obtain information associated with the D2D communication resource of the first UE. The second UE, the third UE, and/or the fourth UE may receive D2D data transmitted from the first UE through the resource indicated by the information associated with the D2D communication resource of the first UE. In this instance, in order to receive, from the eNB, the allocation of resources for D2D communication with the second UE, the third UE, and/or the fourth UE, the first UE may transmit information associated with the amount of D2D data that exists in the buffer of the first UE to the eNB via an SL BSR.

Figure 5:
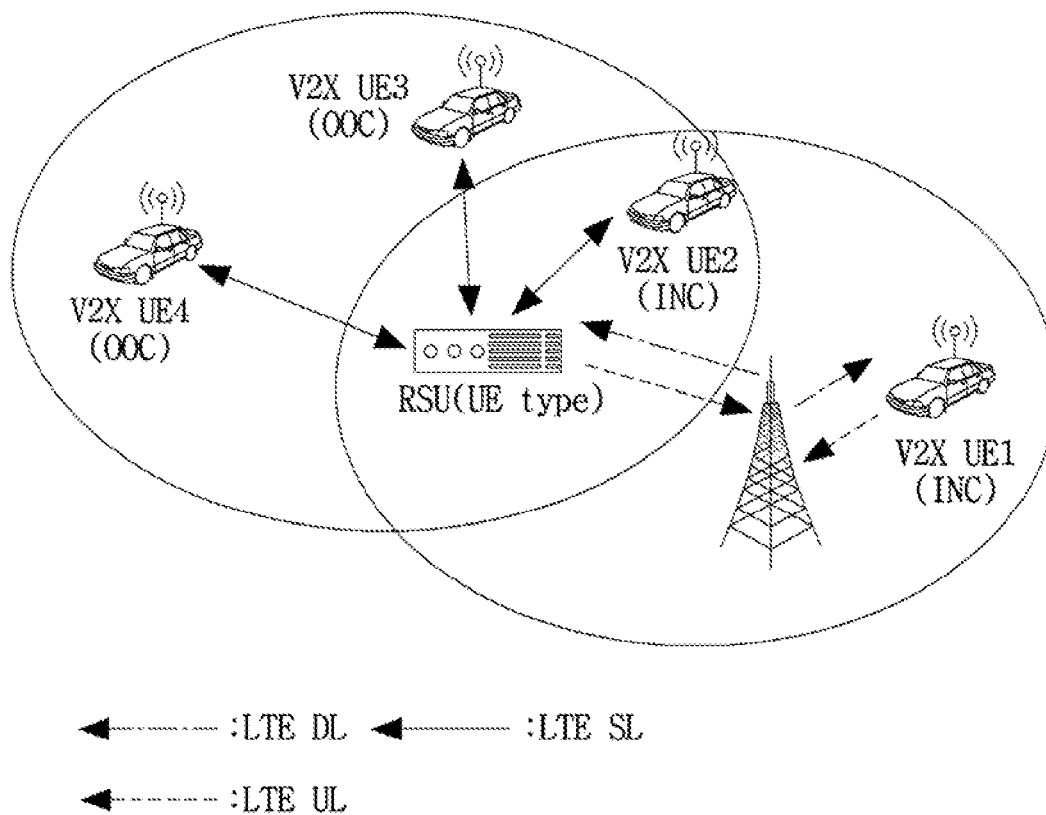
FIG. 5 is a diagram illustrating a D2D communication scenario according to an embodiment.

FIG. 5 is a diagram illustrating a D2D communication scenario according to an embodiment.

In FIG. 5, it is assumed that a first UE (V2X UE1) and a second UE (V2X UE2) are located in the network coverage, whereby they are capable of communicating with an eNB. That is, the first UE and the second UE may perform data transmission and reception for a vehicle communication service via the eNB (Uu interface). In other words, the first UE and the second UE may mutually perform data transmission and reception for the vehicle communication service through UL data transmission and DL data reception. However, when it is assumed that a third UE (V2X UE3) and a fourth UE (V2X UE4) are located outside the network coverage and the location does not allow inter-UE communication with the first UE and the second UE, the third UE and the fourth UE may not be allowed to transmit or receive data for the vehicle communication service with the first UE and the second UE. A UE is incapable of performing communication with another UE, an eNB, a server, and the like which are located in an area where a signal cannot reach physically.

However, when the fourth UE (V2X UE4) outside the network coverage needs to access a network for the purpose of a vehicle communication service, a commercial service, or the like, and D2D communication with a UE-type RSU existing in the network service range is allowed through D2D communication, the UE-type RSU acts as a relay, and thus, the fourth UE (V2X UE4) outside the network coverage may transmit and receive data to/from the eNB through an indirect route. That is, as illustrated in FIG. 4A, the UE-type RSU acts as a relay, the fourth UE (V2X UE4) transmits vehicle communication service data to the UE-type RSU through an SL, and the UE-type RSU may transfer the vehicle communication service data to the eNB using UL transmission via the Uu interface. The vehicle communication service data of the fourth UE may be received by UEs existing in the network coverage including the first UE and the second UE via the downlink of the Uu interface.

UEs, including the fourth UE, which are capable of performing D2D communication with the UE-type RSU and exist outside the network service range, may transfer the vehicle communication service data to UEs existing in the network service range via the UE-type RSU.

Figure 6:
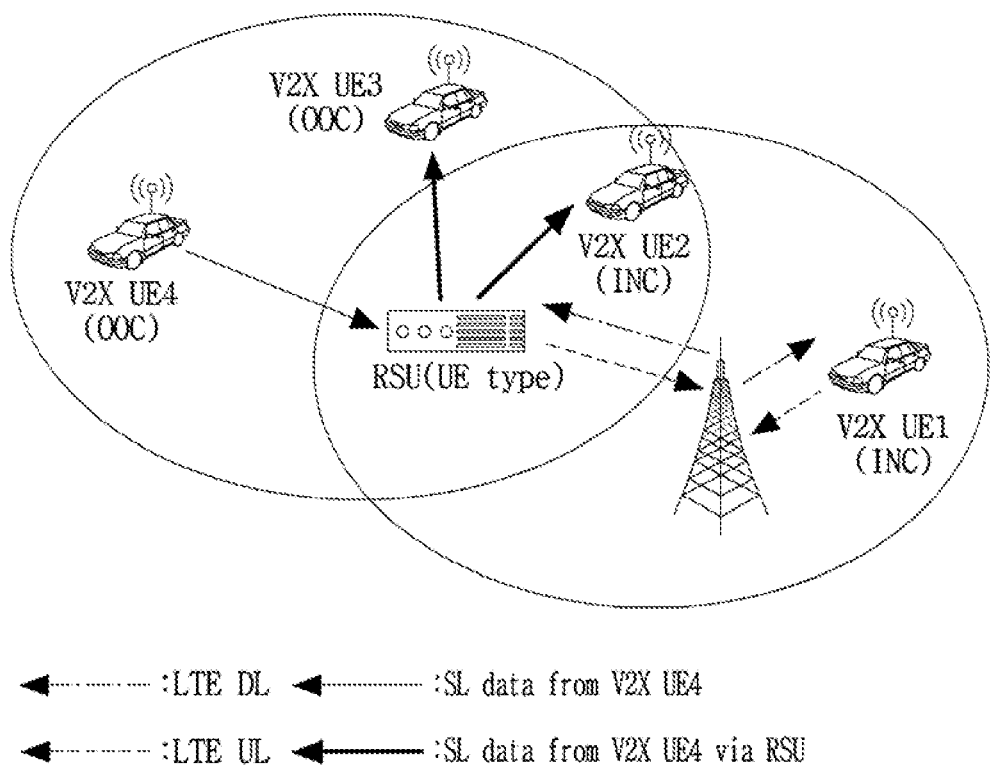
FIG. 6 is a diagram illustrating a D2D communication scenario according to another embodiment.

FIG. 6 is a diagram illustrating a D2D communication scenario according to another embodiment.

Referring to FIG. 6, vehicle communication service data that the fourth UE (V2X UE4) transfers to the UE-type RSU needs to be directly transferred to UEs which exist in a location where the inter-UE communication with the fourth UE is not allowed, but D2D communication with the UE-type RSU is allowed, and exist outside the network service range. Since V2X service is sensitive to a delay time, a delay time, which occurs while data is transferred to the eNB first and is transferred again to the UE-type RSU, needs to be reduced. Therefore, the UE-type RSU may need to prepare for the transmission of data received from the fourth UE to the eNB via an Uu interface (i.e., LTE uplink), and may need to prepare for the transmission of data via an SL. Therefore, when the UE-type RSU operates in a mode in which an SL resource is controlled by the eNB, the vehicle communication service data received from the fourth UE may be managed as data to be included in an LTE BSR, and at the same time, may be managed as data to be included in an SL BSR. That is, the vehicle communication service data received from the fourth UE needs to be transferred to a PDCP/RLC layer in the LTE-side radio bearer (RB), and at the same time, needs to be transferred to the PDCP/RLC layer in the SL-side RB.

Here, in the case of the ProSe Priority per Packet (PPPP) of data delivered to the SL-side RB, the priority order of a received packet is maintained as it is. When an SL-side RB that is mapped to the priority order of the received packet does not exist, the UE-type RSU may autonomously configure a new RB that supports the priority order, and may transmit the packet.

Hereinafter, a resource control method in D2D according to the present embodiment will be described.

There are two modes for the D2D resource control method. Mode 3 refers to a D2D resource control method by an eNB, and Mode 4 is a D2D resource control method by a UE. According to the present disclosure, a number used for indicating a mode may be freely selected. Also, the present disclosure may include any embodiment that uses a different number to distinguish a mode.

In mode 3, an eNB transmits V2X dedicated configuration information as shown in Table 3, to a UE. To this end, a signaling procedure in a radio resource control (RRC) layer (e.g., an RRC connection reconfiguration message) may be used.

TABLE 3

| Information type | descriptions |
| --- | --- |
| SL-V-RNTI | 1) Radio resource allocation is performed via a Uu link which is a radio interface between an eNB and a UE. A physical layer channel used for that is a PDCCH, and resource allocation information associated with a sidelink is provided via a DCI included in the PDCCH.<br>2) In this instance, in order to receive the DCI for the sidelink resource allocation, the fact that the DCI is associated with a corresponding UE needs to be identified. To this end, an ID is |

TABLE 3-continued

| Information type | descriptions |
| --- | --- |
| | allocated to each UE. Here, SL-V-RNTI indicates an ID that is applied only to vehicle communication, which is distinguished from normal sidelink communication. |
| Transmission resource pool information | Transmission resource pool information includes the detailed information as follows:<br>1) Information associated with resources included in a corresponding transmission resource pool among the time/frequency resources of all carriers<br>A. This information may express subframes included in the transmission resource pools in the form of a bitmap. For example, a subframe corresponding to a bit expressed as "1" in the bitmap having a length of 40 is included in the corresponding transmission resource pool, and a subframe corresponding to a bit expressed as "0" is not included in the corresponding transmission resource pool.<br>B. The bitmap is repeatedly applied with respect to the whole frame. For example, when a single frame includes 10 subframes, and a system includes a total of 1024 frames, the system includes a total of 10240 subframes. In this instance, the bitmap having a length of 40 may be repeated 256 times, and may be applied to the entire bitmap (40 × 256 = 10240).<br>C. Also, the frequency resource is expressed as information indicating the number of resource blocks (RBs) which are included in the form of a sub-channel.<br>2) ID information associated with a zone to which a transmission resource pool is applied<br>A. Each zone ID indicates a zone in a different cell, and information associated with each zone is provided to a UE via system information or RRC signaling. For example, each zone may be defined by a rectangular shape indicating a part of a road. Each zone may be identified by a geographical location, such as a GPS. |
| Priority information | 1) A maximum of four priority values from among the values in the range from 1 to 8 are included in a logical channel group that includes logical channels corresponding to respective radio bearers.<br>2) Priority per prose packet (PPPP) may be distinguished by a total of 8 different priority values, and priority values corresponding to respective PPPPs may correspond to the values in the range from 1 to 8, respectively. Therefore, when a new logical channel is generated as sidelink data is generated, a UE may determine a logical channel group which the generated logical channel is to belong to, based on the priority value corresponding to the PPPP of the sidelink data.<br>3) The priority may be high as the priority value is low.<br>4) The logical channel group is a basic unit for reporting a buffer state when a UE configures a BSR associated with a sidelink, which is to be transmitted to an eNB. |
| MCS information | 1) The MCS information is an MCS value set as the default in layer 1 (L1, physical layer), with respect to data to be transmitted via a vehicle communication sidelink.<br>2) An MCS value may be provided when SPS resource allocation and dynamic resource allocation is performed using DCI 5 series, which are L1 sidelink resource allocation information provided from an eNB to a UE via an Uu interface, and when the MCS value is provided, the MCS information provided via RRC signaling may be disregarded. |

Subsequently, the operations of an eNB and a UE in mode 4 will be described as follows.

For example, in mode 4, an eNB provides information as shown in Table 3 to a UE via an RRC connection reconfiguration message, similar to mode 3.

As another example, in mode 4, a UE in an RRC IDLE mode may receive system information block (V2X service-related system information) including information associated with a vehicle communication service from an eNB, and the UE autonomously configures a transmission resource pool based on the information. The V2X service-related system information block may be, for example, SIB21 of Table 4. The SIB21 of Table 4 includes various pieces of configuration information associated with V2X sidelink communication (hereinafter referred to as V2X common configuration information (V2X-Config-Common)).

TABLE 4

```
-- ASN1START
SystemInformationBlockType21-r14 ::= SEQUENCE {
    sl-V2X-ConfigCommon-r14    SL-V2X-ConfigCommon-r14OPTIONAL,        -- Need OR
    lateNonCriticalExtension    OCTET STRING                OPTIONAL,
    ...
}
```

TABLE 4-continued

```
SL-V2X-ConfigCommon-r14 ::=            SEQUENCE {
    v2x-CommRxPool-r14                 SL-CommRxPoolListV2X-r14       OPTIONAL,
    -- Need OR
    v2x-CommTxPoolNormalCommon-r14     SL-CommTxPoolListV2X-r14       OPTIONAL,
    -- Need OR
    p2x-CommTxPoolNormalCommon-r14     SL-CommTxPoolListV2X-r14       OPTIONAL,
    -- Need OR
    v2x-CommTxPoolExceptional-r14      SL-CommResourcePoolV2X-r14     OPTIONAL,
    -- Need OR
    v2x-SyncConfig-r14                 SL-SyncConfigListV2X-r14  OPTIONAL,    --
Need OR
    v2x-InterFreqInfoList-r14          SL-InterFreqInfoListV2X-r14         OPTIONAL,
    -- Need OR
    v2x-ResourceSelectionConfig-r14    SL-CommTxPoolSensingConfig-r14
    OPTIONAL,           -- Need OR
    zoneConfig-r14      SL-ZoneConfig-r14OPTIONAL,          -- Need OR
    typeTxSync-r14      SL-TypeTxSync-r14          OPTIONAL,     -- Need OR
    thresSL-TxPrioritization-r14   SL-Priority-r13    OPTIONAL,   -- Need OR
    anchorCarrierFreqList-r14      SL-AnchorCarrierFreqList-V2X-r14   OPTIONAL,      --
Need OR
    offsetDFN-r14                 INTEGER (0..1000)        OPTIONAL,    -- Need OR
    cbr-CommonTxConfigList-r14                    SL-CBR-CommonTxConfigList-r14
    OPTIONAL           -- Need OR
}
-- ASN1STOP
```

The detailed configuration information associated with the transmission resource pool for mode 4 may be configured to be the same as the detailed configuration information associated with the transmission resource pool for mode 3.

Here, in mode 4, a plurality of pieces of transmission resource pool information may be provided in the form of a list (SL-CommTxPoolListV2X). As necessary, the eNB may transmit an RRC connection reconfiguration message in order to release some of the previously configured transmission pools or to configure a new transmission resource pool which is operable in mode 4. Also, the UE may autonomously select some resources to be actually used for V2X data transmission from among the resources in the transmission resource pool, and the eNB may transmit, to the UE, reference parameter information which is used as a criterion to select the resources.

When the eNB does not provide the reference parameter information, or when the UE is incapable of receiving the reference parameter information from the eNB, such as the case in which the UE is in an RRC IDLE mode or the case in which the UE is outside the network coverage, the UE may select resources in the transmission resource pool using parameter information stored in an embedded memory.

The reference parameter information or the parameter information stored in the UE may include information associated with a reference value which is based on a reference signal received power (RSRP) of a physical sidelink shared channel (PSSCH). Here, the RSRP may correspond to the energy level of a signal in the V2X system.

According to an embodiment of the present specification, the UE may support sidelink carrier aggregation (CA). In an aspect of the present disclosure, when a V2X UE that supports a sidelink i) identifies that there are at least two carriers or serving cells which may be used via a sidelink (i.e., carriers or serving cells that may provide a V2X service via an SIB, and provides at least one piece of transmission resource pool information or reception resource pool information), and ii) is capable of transmitting and receiving data via the identified carriers or serving cells in parallel, it is construed that the corresponding V2X supports sidelink CA.

In another aspect of the present disclosure, when a V2X UE that supports a sidelink i) identifies there are at least two serving cells which may be used via a sidelink, ii) identifies provision of V2X carrier configuration information which may be used by each serving cell, and iii) is capable of transmitting and receiving data via the identified serving cells in parallel, it is construed that the corresponding V2X UE supports sidelink CA.

The existing mode3/mode4 D2D resource control methods were designed without taking into consideration sidelink CA, and thus, the existing methods simply distinguish modes from the perspective of a UE. However, sidelink CA assumes that a plurality of carriers or serving cells are used for sidelink signal transmission and reception, and thus, there is a desire for a method of applying a mode in the sidelink CA.

I. Sidelink CA Operation Method

According to the present embodiment, sidelink CA takes into consideration a plurality of carriers or serving cells, in addition to a UE, and thus, a mode may be configured based on a UE, or may be configured based on a serving cell.

1. First Embodiment for Configuring Mode 3 or Mode 4 Based on a UE

Configuring a mode based on a UE indicates that the same mode is applied to all serving cells configured for the corresponding UE when a plurality of serving cells are configured for the UE. For example, when mode 3 is configured for a V2X UE for which serving cell #1 and serving cell #2 are configured, mode 3 may be equally applied to serving cell #1 and serving cell #2.

The UE may not perform sidelink communication for V2X on serving cells (or carriers) other than a frequency band which is configured by an eNB as a serving cell. That is, although another carrier exists which the UE is capable of autonomously and additionally using or operating, when the other carrier is not configured for the UE, the UE may not operate in mode 4 based on system information or the like provided by the other carrier. In other words, when carrier set a including carriers on which the UE that supports sidelink CA is operable is larger than carrier set b which is configured by an eNB, the UE may perform sidelink communication for V2X only on the carriers belonging to the carrier set b.

Figure 7:
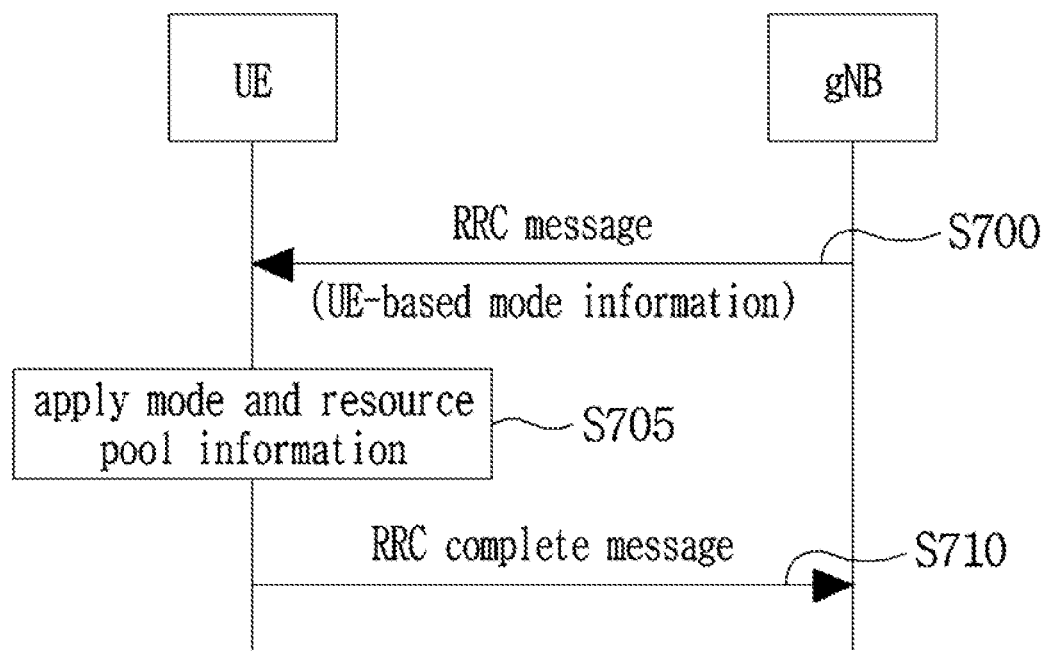
FIG. 7 is a flowchart illustrating an RRC signaling procedure for configuring sidelink CA according to a first embodiment.

FIG. 7 is a flowchart illustrating an RRC signaling procedure for sidelink CA configuration according to a first embodiment.

Referring to FIG. 7, in order to configure sidelink CA according to the first embodiment, an eNB may generate an RRC message including V2X dedicated configuration information as shown in Table 3, and may transmit the generated RRC message to a UE in operation S700. UE-based mode information is included in the RRC message.

For example, the eNB may transmit transmission resource pool information to the UE. Here, the method that the eNB uses for transmitting the transmission resource pool information may be different based on the mode of the UE.

According to an aspect of the present disclosure, when the UE is configured to operate in mode 3, the eNB may include only single piece of transmission resource pool information in the RRC message. Therefore, common resources for V2X communication may be allocated so as to easily support various services, such as duplicated packet transmission or the like. In this instance, the single piece of transmission resource pool information may be equally applied to all service cells configured for the UE.

Alternatively, the eNB may include transmission resource pool information which is different for each serving cell, in the RRC message. Therefore, the amount of resources to be allocated to each serving cell for V2X communication may be differently set. In this instance, in order to indicate a serving cell to which a corresponding transmission resource pool is applied (or mapped) for each transmission resource pool, the eNB may include cell index value information configured by the UE in the RRC message. Here, the cell index value may be one in the range from 0 to 31.

According to another aspect of the present disclosure, when the UE is configured to operate in mode 4, the eNB may include a transmission resource pool list in the RRC message. Therefore, common resources for V2X communication may be allocated so as to easily support various services, such as duplicated packet transmission or the like. In this instance, the transmission resource pool list may be equally applied to all service cells configured for the UE.

Alternatively, the eNB may include transmission resource pool list which is different for each serving cell, in the RRC message. Therefore, the amount of resources to be allocated to each serving cell for V2X communication may be differently set. In this instance, a cell index value configured by the UE may be included in each transmission resource pool list.

As another example, the eNB allocates only a single SL-V-RNTI for the UE configured to operate in mode 3.

As another example, the eNB may include a single piece of priority information and MCS information in the RRC message, and may transmit the same to the UE.

When the RRC message is received in operation S700, the UE may set a mode based on the detailed configuration information (mode information, transmission resource pool information, or the like) included in the RRC message, and may configure a transmission resource pool in operation S705.

When RRC configuration is successfully completed, the UE may transmit an RRC complete message to the eNB in operation S710.

2. Second Embodiment for Configuring Mode 3 or Mode 4 Based on a UE

Configuring a mode based on a UE indicates that the same mode is applied to all serving cells configured for the corresponding UE when a plurality of serving cells are configured for the UE. For example, when mode 3 is configured for a V2X UE for which serving cell #1 and serving cell #2 are configured, mode 3 may be equally applied to serving cell #1 and serving cell #2. The eNB may configure mode 3 or mode 4 based on a UE, and the modes may be distinguished based on whether a serving cell is configured.

The UE may perform sidelink communication for V2X under a predetermined condition, on a serving cell (or carrier) in addition to a frequency band which is configured by the eNB as a serving cell. That is the difference from the first embodiment.

As an example, when another carrier exists which the UE is capable of autonomously and additionally using (or operating), the UE may operate in mode 4 based on system information or the like provided by the other carrier although the other carrier is not configured for the UE. In other words, when carrier set a including carriers on which the UE that supports sidelink CA is operable is larger than carrier set b which is configured by the eNB, the UE may perform sidelink communication for V2X on the carriers that belong to the carrier set a, excluding the carriers belong to carrier set b.

Here, the UE may operate in the same manner as the case in which the UE is incapable of receiving information from the eNB, such as when the UE is in the RRC IDLE mode or when the UE is outside the network coverage. For example, the UE may perform: an operation of identifying a frequency band that allows the UE to perform V2X transmission and reception, an operation of identifying transmission and reception resource pool information in the V2X service-related system information, such as SIB21 or the like, transmitted from the eNB on a carrier included in the frequency band, and an operation of performing V2X sidelink communication via the transmission and reception resource pool. Alternatively, the UE may perform: an operation of identifying that the frequency band is not the network coverage; and an operation of performing V2X sidelink communication based on transmission and reception resource pool information corresponding to the frequency band stored in a memory embedded in the UE when it is identified that the frequency band allows V2X transmission and reception (i.e., when the UE identifies the current position using a device capable of identifying the position of the UE, such as a GPS system, and identifies that the frequency band allows V2X transmission and reception at the identified position, based on information stored in the memory embedded in the UE such as a USIM chip).

As another example, when another carrier exists which the UE is capable of autonomously and additionally using (or operating), an indicator may be used, which indicates whether the UE is to perform the operation of mode 4 on the other carrier. According to an aspect of the present disclosure, the eNB may include the indicator in the RRC message, and may transmit the same to the UE. According to another aspect of the present disclosure, the eNB may include the indicator in V2X service-related system information, and may transmit the same to the UE. Here, the indicator may indicate, to a UE in the RRC connected mode, whether the operation of mode 4 is allowed or is not allocated on the other carrier.

Figure 8:
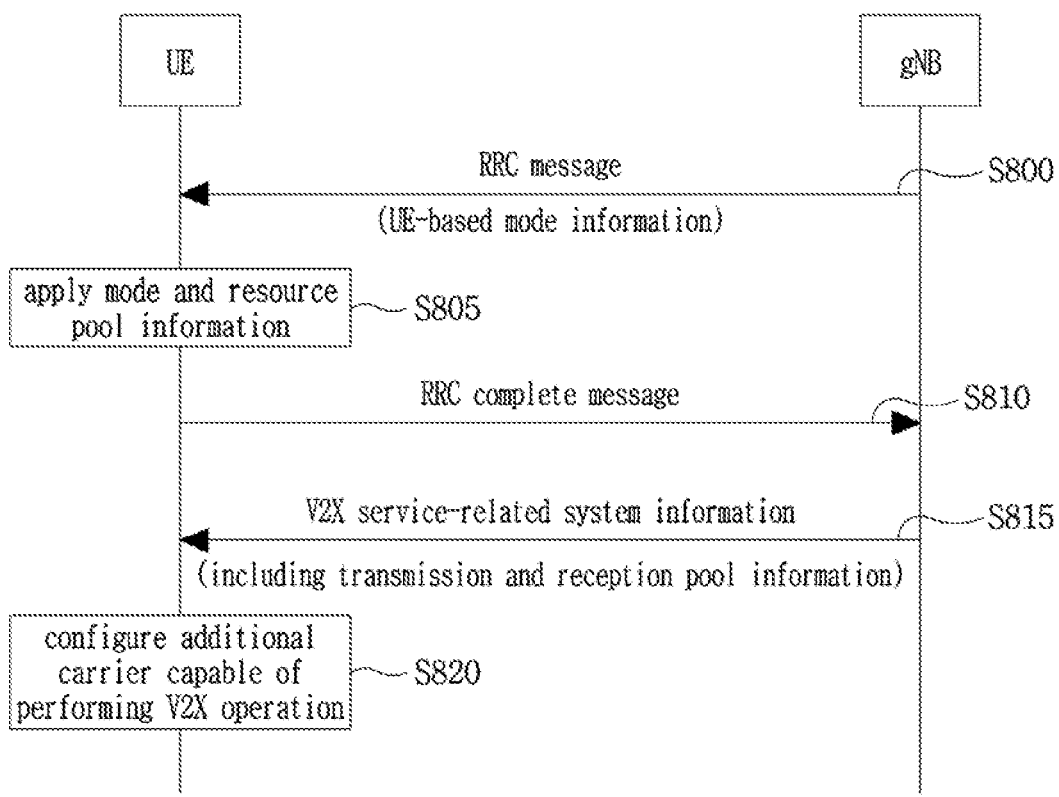
FIG. 8 is a flowchart illustrating an RRC signaling procedure for configuring sidelink CA according to a second embodiment.

FIG. 8 is a flowchart illustrating an RRC signaling procedure for configuring sidelink CA according to a second embodiment.

Referring to FIG. 8, in order to configure sidelink CA according to the second embodiment, an eNB may generate an RRC message including V2X dedicated configuration information as shown in Table 3, and may transmit the generated RRC message to a UE in operation S800. UE-based mode information is included in the RRC message.

For example, the eNB may transmit transmission resource pool information to the UE. Here, the method that eNB uses for transmitting the transmission resource pool information is different based on the mode of the UE.

According to an aspect of the present disclosure, when the UE is configured to operate in mode 3, the eNB may include only a single piece of transmission resource pool information in the RRC message. Therefore, common resources for V2X communication may be allocated so as to easily support various services, such as duplicated packet transmission or the like. In this instance, the single piece of transmission resource pool information may be equally applied to all service cells configured for the UE.

Alternatively, the eNB may include transmission resource pool information which is different for each serving cell, in the RRC message. Therefore, the amount of resources to be allocated to each serving cell for V2X communication may be differently set. In this instance, in order to indicate a serving cell to which a corresponding transmission resource pool is applied (or mapped) for each transmission resource pool, the eNB may include cell index value information configured by the UE in the RRC message. Here, the cell index value may be one in the range from 0 to 31.

According to another aspect of the present disclosure, when the UE is configured to operate in mode 4, the eNB may include a transmission resource pool list in the RRC message. Therefore, common resources for V2X communication may be allocated so as to easily support various services, such as duplicated packet transmission or the like. In this instance, the transmission resource pool list may be equally applied to all service cells configured for the UE.

Alternatively, the eNB may include transmission resource pool list which is different for each serving cell, in the RRC message. Therefore, the amount of resources to be allocated to each serving cell for V2X communication may be differently set. In this instance, a cell index value configured by the UE may be included in each transmission resource pool list.

As another example, the eNB allocates only a single SL-V-RNTI for the UE configured to operate in mode 3.

As another example, the eNB may include a single piece of priority information and MCS information in the RRC message, and may transmit the RRC message to a UE.

When the RRC message is received in operation S800, the UE may set a mode based on the detailed configuration information (mode information, transmission resource pool information, or the like) included in the RRC message, and may configure a transmission resource pool in operation S805.

When RRC configuration is successfully completed, the UE transmits an RRC complete message to the eNB in operation S810.

When the UE is in the RRC IDLE mode, the eNB includes, in the V2X service-related system information, an indicator indicating whether the UE is to perform the operation of mode 4 on the other carrier, and transmit the same to the UE in operation S815. Here, the indicator may indicate, to a UE in the RRC connected mode, whether the operation of mode 4 is allowed or is not allocated on another carrier. V2X common configuration information (e.g., transmission and reception pool resource information) may be included in the V2X service-related system information.

When another carrier exists, which the UE is capable of autonomously and additionally using (or operating), the UE configures the other carrier, and may perform sidelink communication via the other carrier in operation S820.

3. Third Embodiment for Configuring Mode 3 or Mode 4 Based on a Serving Cell

Configuring a mode based on a serving cell indicates that a D2D resource control method (i.e., mode) is individually applied to each of all serving cells configured for a corresponding UE when a plurality of serving cells are configured for the UE. For example, when serving cell #1 and serving cell #2 are configured for a V2X UE, mode 3 is applied to serving cell #1 and mode 4 is applied to serving cell #2.

Figure 9:
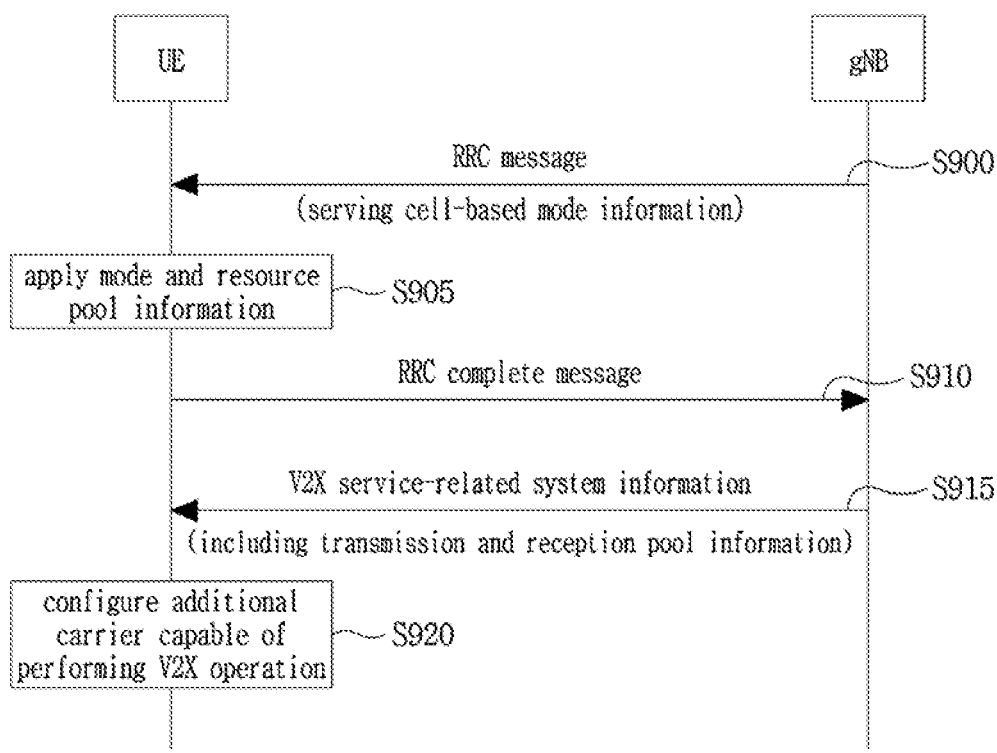
FIG. 9 is a flowchart illustrating an RRC signaling procedure for configuring sidelink CA according to a third embodiment.

FIG. 9 is a flowchart illustrating an RRC signaling procedure for configuring sidelink CA according to a third embodiment.

Referring to FIG. 9, in order to configure sidelink CA according to the third embodiment, an eNB may generate an RRC message including V2X dedicated configuration information as shown in Table 3, and may transmit the generated RRC message to a UE in operation S900. Serving cell-based mode information is included in the RRC message.

For example, when a predetermined serving cell is configured to operate in mode 3, the eNB generates an RRC message by including a cell index or a serving cell index in the RRC message. Here, the cell index value may be one in the range from 0 to 31. The eNB may include transmission resource pool information associated with the predetermined serving cell in the RRC message.

As another example, when another carrier exists that the UE is capable of autonomously and additionally using (or operating), the eNB generates an RRC message by including, in the RRC message, an indicator which indicates whether the UE is to perform the operation of mode 4 on the other carrier. Also, the eNB may include the indicator in V2X service-related system information, and may transmit the same to the UE. Here, the indicator may indicate, to a UE in the RRC connected mode, whether the operation of mode 4 is allowed or is not allocated on the other carrier. Therefore, when another carrier exists that the UE is capable of additionally using (or operating), the UE that receives the indicator may perform the operation of mode 4 on the other carrier.

As another example, when a predetermined serving cell is configured to operate in mode 4, the eNB generates an RRC message by including, in the RRC message, a transmission resource pool list for a serving cell configured to operate in mode 4. On another carrier that is not configured for the UE, the UE may not perform communication using the transmission and reception resource pool information obtained via the system information of the other carrier.

As another example, the eNB allocates only a common (or a single) SL-V-RNTI which is applied to only the serving cells configured to operate in mode 3.

As another example, the eNB may include a single piece of priority information and MCS information in the RRC message, and may transmit the RRC message to the UE.

When the RRC message is received in operation S900, the UE may configure a mode for each serving cell based on the configuration information (mode information, transmission resource pool information, or the like) included in the RRC message, and may configure a transmission resource pool for each serving cell in operation S905.

When RRC configuration is successfully completed, the UE may transmit an RRC complete message to the eNB in operation S910.

The eNB may transmit V2X common configuration information (e.g., transmission and reception resource pool information) associated with another carrier to the UE via system information associated with the other carrier which is not configured for the UE in operation S915.

When the UE is capable of autonomously and additionally using (or operating) the other carrier, the UE may configure the other carrier and perform communication via the other carrier in operation S920.

II. Duplicated Packet Transmission Method in Sidelink CA

Hereinafter, a resource management method for duplicated packet transmission in a V2X system that supports sidelink CA will be described.

A method that is generally used to increase the reliability of data transmission in a wireless communication system is retransmission, such as HARQ and ARQ. The method is to send information (e.g., NACK) that requires retransmission of a data packet to a transmitting end such that the data packet including the same information is retransmitted, when a reception end determines that data reception has an error. The method may obtain a time diversity gain which may be obtained since a radio channel that a data packet goes through changes over time. Also, the amount of energy of an information signal received by the reception end may be increased and thus, the rate of a successful data reception may be increased.

When an error occurs in originally transmitted data, the above-described ARQ/HARQ scheme needs an additional time for successful reception of packet data, and thus, a point in time at which data transmission is completed may be delayed. When the QoS of a predetermined service requires a significantly short delay time, this may not be satisfied by the ARQ/HARQ scheme. Therefore, in order to satisfy the QoS, a diversity gain and an increase in the amount of received energy via reception of a plurality of packets need to be secured without an increase in a delay time. Therefore, there is a desired for a duplicated packet transmission scheme. The duplicated packet transmission scheme may be applied to the case in which a frequency diversity gain is obtained, such as when a scheme, such as dual connectivity, is used, which is capable of performing transmission and reception with two different eNB, or when carrier aggregation is used, which is capable of performing transmission and reception with a plurality of cells within a single eNB.

In scenarios that require data communication via a sidelink which have been described with reference to FIGS. 2 to 4B, there are needed a duplicated packet transmission and an operation method therefor, which are suitable for a sidelink in order to satisfy a new V2X service requirement that requires high-reliability and short-delay QoS.

Figure 10A:
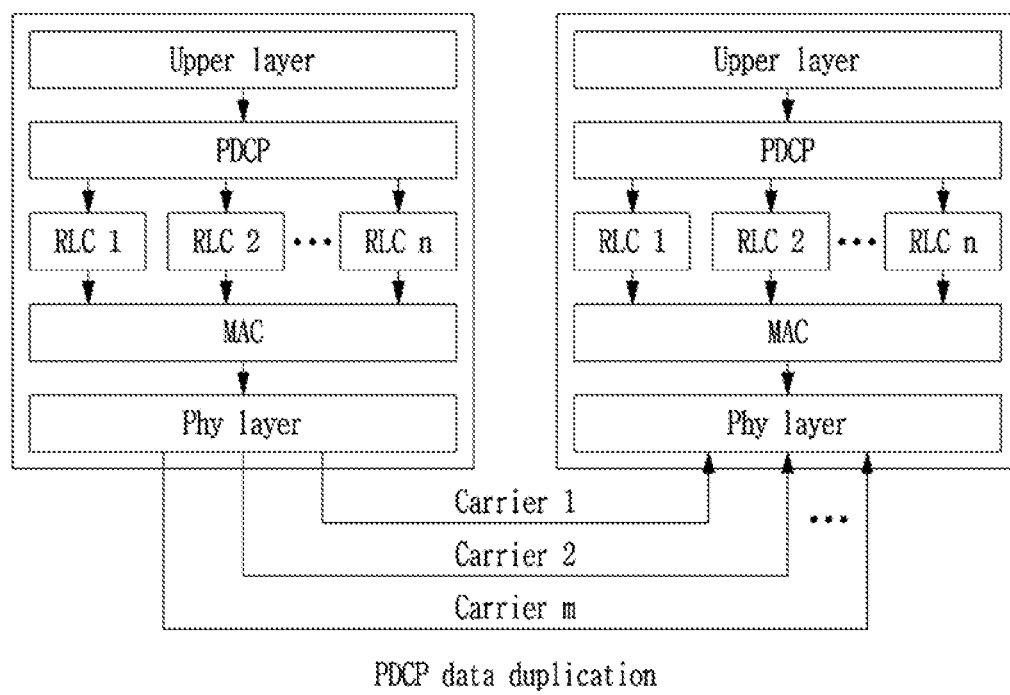
FIG. 10A is a schematic diagram conceptually illustrating resource blocks (RBs) that support a PDCP data duplication scheme in which a single PDCP entity is associated with two or more RLC entities and logical channels.
Figure 10B:
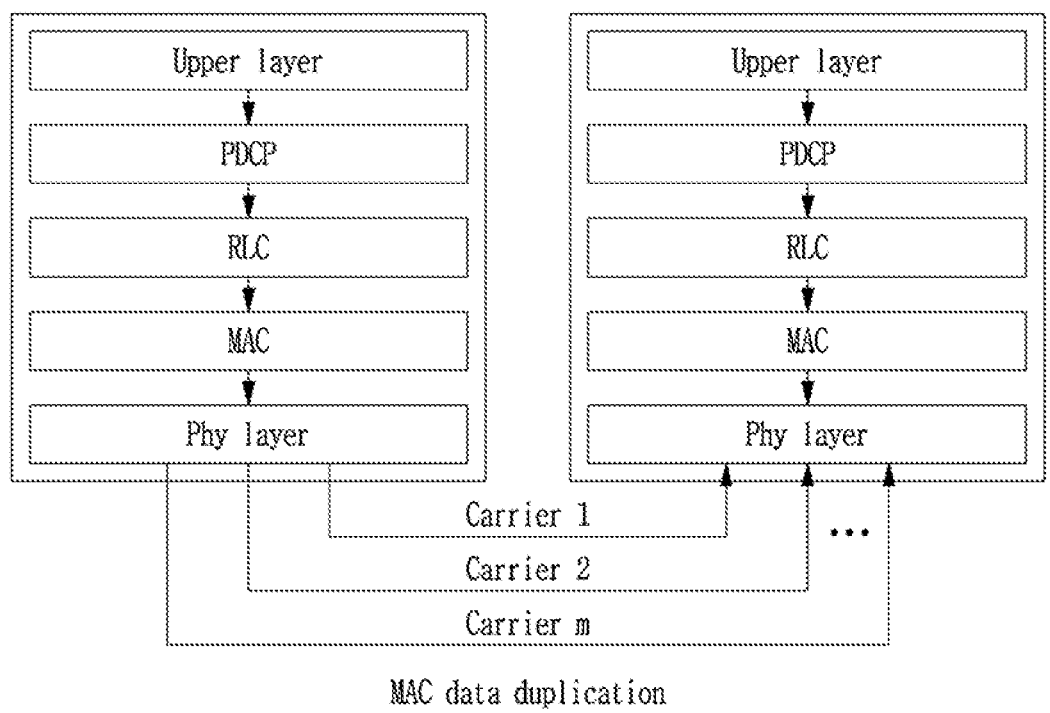
FIG. 10B is a schematic diagram conceptually illustrating the configuration including a single PDCP entity and a single RLC entity, such as the configuration of a normal radio bearer.

FIGS. 10A and 10B are diagrams illustrating two schemes for duplicated packet transmission according to the present embodiment.

FIG. 10A is a schematic diagram conceptually illustrating resource blocks (RBs) that support a PDCP data duplication scheme in which a single PDCP entity is associated with two or more RLC entities and logical channels.

Referring to FIG. 10A, RBs exist in at least two different carriers or serving cells. At the side of a Tx UE, when a data packet is received by a PDCP entity from a higher layer such as an SDAP layer or an IP layer, the PDCP entity may generate a plurality of data packets in the form of a plurality of PDCP packet data units (PDUs) (at least two PDCP PDUs) including the same information. The plurality of data packets may be respectively transferred to different RLC entities which have connection with the PDCP entity. The data may be transferred to a MAC layer via different logical channels. In order to enable the data, which is transmitted via a logical channel, to be transmitted via a serving cell different for each logical channel in the MAC layer, a MAC PDU may be configured by distinguishing resource allocation information of each serving cell, and the data may be transmitted via a serving cell or a carrier capable of performing a different SL transmission from others. At the side of a Rx UE, the data are transferred to a PDCP entity, and the PDCP entity receives the data, identifies a sequence number (SN) or the like which is information indicating the order of packet data, recognizes that the data packet is transmitted in duplicate, and discards all excluding one successfully received data packet.

FIG. 10B is a schematic diagram conceptually illustrating a configuration including a single PDCP entity and a single RLC entity, such as the configuration of a normal radio bearer.

Referring to FIG. 10B, in order to perform duplicated data transmission in the MAC layer, the UE may need to receive SL resource allocations, which allow transmission of at least the same amount of data, for different serving cells or carriers. In this instance, the MAC layer may configure the same MAC PDU in duplicate, in order to perform duplicated transmission of a data packet received from a predetermined logical channel, and may transmit the same via serving cells or carriers capable of performing different SL transmissions. The RX UE identifies information associated with the MAC PDUs and transfer the information to the RLC entity. The RLC or PDCP entity may perform redundancy check using an SN as shown in FIG. 10A, and discard all excluding one that is successfully received Hereinafter, the present specification discloses a method in which an RSU and UEs for vehicle communication distinguishes mode 3 in which UEs are under the control of an eNB, and mode 4 in which UEs autonomously operate, based on the duplicated packet transmission scheme which has been described in FIGS. 10A and 10B, and performs duplicated packet transmission for each case.

1. First Embodiment that Performs Duplicated Packet Transmission when a UE Operates in Mode 3

Figure 11:
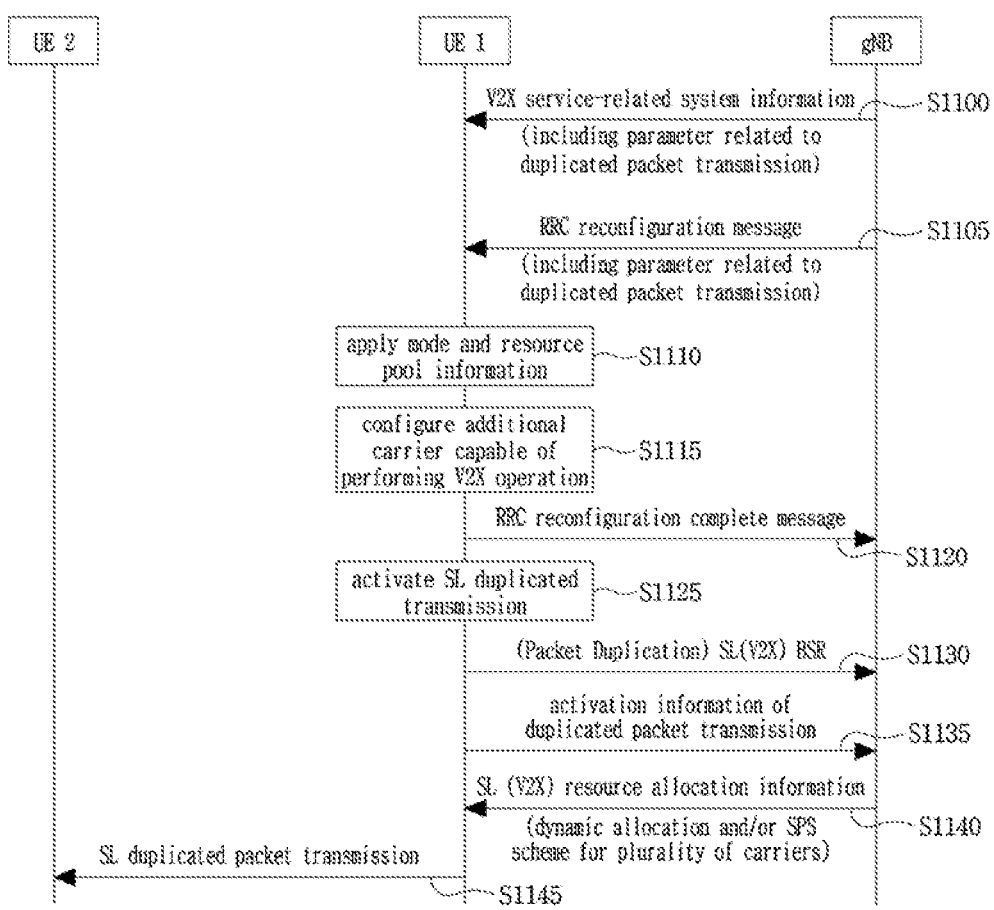
FIG. 11 is a flowchart illustrating a method of performing duplicated packet transmission in sidelink CA according to an embodiment.

FIG. 11 is a flowchart illustrating a method in which duplicated packet transmission is performed in sidelink CA according to an embodiment.

Referring to FIG. 1, an eNB transmits a parameter associated with duplicated packet transmission to UE 1 via V2X service-related system information or an RRC signaling procedure. The RRC signaling procedure may include an RRC connection reconfiguration procedure. When serving cells (or carriers), on which duplicated packet transmission is activated, are configured to operate in different modes (e.g., when a first serving cell is configured to operate in mode 3, and a second serving cell is configured to operate in mode 4), the eNB may transmit a parameter associated with duplicated packet transmission via various routes.

For example, the eNB transmits V2X service-related system information including a parameter associated with duplicated packet transmission to UE 1 in operation S1100. For example, operation S1100 may be performed on the serving cells configured to operate in mode 4 from among two or more serving cells (or carriers) when two or more serving cells (or carriers) are configured for the UE. Alternatively, operation S1100 may be performed with respect to a UE in an RRC IDLE mode.

As another example, the eNB transmits an RRC connection reconfiguration message including a parameter associated with duplicated packet transmission to UE 1 in operation S1105. For example, operation S1105 may be performed on the serving cells configured to operate in mode 3 from among two or more serving cells (or carriers) when the two or more serving cells (or carriers) are configured for the UE. Alternatively, operation S1105 may be performed with respect to a UE in an RRC connected mode.

The parameter associated with duplicated packet transmission may include an allow indicator indicating whether to allow sidelink duplicated packet transmission. For example, information indicating whether to allow sidelink duplicated packet transmission may indicate permission or non-permission, using one bit (allow indicator=1 or 0). That is, the eNB may indicate whether UE 1 in mode 3 is capable of performing a duplicated V2X packet transmission scheme, via an RRC message.

When sidelink duplicated packet transmission is permitted (i.e., allow indicator=1), the parameter associated with duplicated packet transmission may further include information associated with an activation condition of duplicated packet transmission.

According to an aspect of the present disclosure, the information associated with the activation condition may include an allow cell indication information indicating a predetermined frequency band or serving cell that allows duplicated packet transmission. The eNB may confine duplicated packet transmission to the predetermined frequency band or serving cell using the allow cell indication information. That is to preemptively prevent an increase in the load of radio resources in the predetermined frequency band or serving cell, which may occur when duplicated packet transmission of UE 1 is activated. The information associated with the activation condition may be defined as information associated with a carrier or serving cell in capable of performing packet transmission is not allowed. When allow cell indication information does not exist, it is agreed, in advance, between a UE and an eNB that duplicated packet transmission is allowed on all carriers or serving cells capable of performing sidelink transmission.

According to another aspect of the present disclosure, the information associated with the activation condition may include a channel busy rate (CBR) value. The CBR value may be set to have a value in the range between 0 and 1, for example, 0.1, 0.2, 0.3 . . . , and 0.9. When the CBR value is less than or equal to a threshold value, UE 1 may activate duplicated packet transmission on a carrier (or serving cell) on which duplicated packet transmission is allowed. Here, the CBR value may be defined by a value corresponding to the final value obtained by applying an offset value provided from the eNB and the received signal strength indicator (RSSI) value of a sidelink.

The fact that the RSSI value is high indicates that other UEs are transmitting signals via a corresponding channel. Therefore, that fact indicates that the corresponding channel is frequently used by other UEs. Accordingly, UE 1 may have difficulty in maintaining reception reliability due to inter-signal interference when transmitting a corresponding packet. Therefore, UE 1 may consider activating duplicated packet transmission in order to increase the reception reliability.

When the threshold value of the CBR value, which is the information associated with the activation condition, is greater than or equal to a threshold value, UE 1 may activate duplicated packet transmission on a carrier (or serving cell) on which duplicated packet transmission is allowed. The threshold value may be defined by a value of which the RSSI value of a channel compared to the reliability required by a packet to be transmitted, is not relatively high. In this instance, the reception reliability of the corresponding packet has no problem even though duplicated packet transmission is not performed via the corresponding channel.

For the CBR value which is information associated with the activation condition, two threshold values may be defined. One of which is "maximum threshold value" that indicates the case in which the RSSI value of a channel is high and a corresponding carrier (or serving cell) is frequently used by other users, and indicates a predetermined threshold value used for the condition that limits the above-described CBR value to the predetermined threshold value or less. The other of which is "minimum threshold value" to indicate that the RSSI value of the channel is significantly low and the reception reliability of a corresponding packet has no problem even though duplicated packet transmission is not performed via the corresponding channel. Therefore, the activation condition may be defined by a CBR value that is greater than or equal to the minimum threshold value and less than or equal to the maximum threshold value, based on the two threshold values.

According to another aspect of the present disclosure, the information associated with the activation condition may include a priority per prose packet (PPPP) value that requires duplicated packet transmission. That is, the eNB provides, to UE1, the PPPP value which requires duplicated packet transmission from among data that UE 1 is to transmit via a sidelink. The PPPP values may have a total of 8 values (natural numbers in the range from 1 to 8). When the data that UE 1 is to transmit does not correspond to the PPPP value, UE 1 may not activate duplicated packet transmission. Conversely, when the data that UE 1 is to transmit corresponds to the PPPP value, UE 1 may activate duplicated packet transmission. The eNB provides QoS corresponding to each PPPP value to UE 1. For example, QoS may be configured in the form of providing mapping information between a logical channel group (LCG) and a PPPP. Alternatively, when UE 1 registers at a ProSe server, a server that manages a ProSe service may configure a QoS value corresponding to a PPPP.

Here, a new parameter indicating the reliability of a corresponding packet may be provided instead of the PPPP value which is the information associated with the activation condition. The PPPP value may be determined by taking into consideration various QoS related parameters, such as the minimum required reliability of a corresponding packet, minimum required delay time, a service type, or the like. However, the new parameter may be defined by taking into consideration only the minimum required reliability or may be defined by additionally taking into consideration the delay time. Therefore, although the PPPP values are the same, new parameter values may be different from each other, or although the PPPP values are different from each other, new parameter values may be the same. The new parameter may be referred to as "packet reliability parameter". The new parameter may have a value which is distinguished by 8 levels from 0 to 7, or may be a value which is distinguished by 16 levels from 0 to 15.

Each system information or RRC message is received in operations S1100 or S1105, UE 1 may set a mode based on the configuration information (mode information, transmission resource pool information, parameter associated with duplicated packet transmission, or the like) included in the system information or the RRC message, and may configure a transmission resource pool in operation S1110.

Also, when UE 1 is capable of autonomously and additionally using (or operating) another carrier, UE 1 may configure the other carrier in operation S1115.

When RRC reconfiguration is successfully completed, UE 1 transmits an RRC reconfiguration complete message to the eNB in operation S1120.

When data for which duplicated packet transmission needs to be activated is generated, UE 1 selects or activates a serving cell or carrier that is capable of duplicated packet transmission, based on the activation condition, in operation S1125. Here, two or more serving cells (or carriers) exist on which duplicated packet transmission is activated, the serving cells (or carriers) may be configured to operate in the same mode, or may be configured to operate in different modes.

For example, when the serving cells (or carriers) on which duplicated packet transmission is activated are configured to operate in different modes (e.g., when a first serving cell is in mode 3 and a second serving cell is in mode 4), UE 1 transmits V2X BSR to the eNB in operation S1130 in order to receive resource allocation for the first serving cell, and receives the resource allocation information from the eNB in operation S1140. Here, when the eNB receives packet duplication activation MAC data in operation S1135 or receives an SL (or V2X) BSR related to duplicated packet transmission in operation S1130 from UE 1, the eNB may not allocate a radio resource on a subframe, a transmission time interval (TTI), or a PSSCH transmission interval existing at the same point in time, with respect to different serving cells which are capable of performing transmission via sidelink CA, by always taking into consideration packet duplication activation. That is, the eNB, which is capable of determining resource allocation, may finally determine the duplicated packet transmission of UE 1.

UE 1 may select a radio resource existing at the point in time at which transmission is performed on a serving cell in mode 3, from among radio resources in a transmission resource pool of a serving cell in mode 4 (or a carrier operable in mode 4), and may perform duplicated packet transmission.

When at least some resources in the transmission resource pools of serving cells (or carriers) in different modes do not correspond to the subframe, TTI, or PSSCH transmission interval existing at the same point in time, UE 1 may select a subframe, TTI, or PSSCH transmission interval existing in a time interval in which duplicated transmission is allowed. The time interval in which the duplicated transmission is allowed may be defined in advance. For example, the time interval may be set based on a delay time that is allowed while satisfying V2X service requirements.

According to an aspect of the present disclosure, the time interval may be configured by the eNB for each PPPP. Alternatively, the time interval may be configured as a fixed value for each UE. The eNB may determine a corresponding time interval value by taking into consideration the maximum allowed time delay of each V2X service, data load, or the like, and may configure the same for each UE.

According to another aspect, the time interval may be fixedly configured for each PPPP. In this instance, a fixed time interval is determined by taking into consideration only the maximum allowed delay time of a V2X service, and information thereof is included in V2X preconfigured information of UE1 and is stored in an embedded memory of the UE.

As another example, when all serving cells (or carriers) on which duplicated packet transmission is activated are configured to operate in mode 3, UE 1 may calculate a BS value by adding the amount of data that is increased due to the activation of duplicated packet transmission among the data to be calculated currently as a SL BSR. That is, the activation of duplicated packet transmission may tigers SL(V2X) BSR transmission. Logical channels (LCs) corresponding to PPPPs that allow activation of duplicated packet transmission may be configured in the same LCG (based on a priority order provided by the eNB). In this instance, LCIDs of the SL(V2X) BSR associated with duplicated packet transmission may be defined, which indicate that duplicated packet transmission is activated, such that UE 1 identifies that the SL(V2X) BSR is triggered in consideration of the activation of duplicated packet transmission. That is distinguished from an LCID which indicates a normal SL(V2X) BSR that is triggered irrespective of the activation of the duplicated packet transmission.

According to an aspect of the present disclosure, the LCID related to duplicated packet transmission may be added for each LCID indicating an SL(V2X) BRS. For example, the LCID value of a normal SL(V2X) BSR as shown in Table 5 is "10111". However, the LCID value of an SL(V2X) BSR related to duplicated packet transmission may be "10011".

TABLE 5

| Index | LCID values |
| --- | --- |
| 00000 | CCCH |
| 00001-01010 | Identity of the logical channel |
| 01011 | CCCH |
| 01011 | CCCH |
| 01100-10001 | Reserved |
| 10010 | Packet Duplication Truncated Sidelink BSR |
| 10011 | Packet Duplication Sidelink BSR |
| 10100 | Recommended bit rate query |
| 10101 | SPS Confirmation |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

According to another aspect of the present disclosure, the LCD value of a normal Truncated SL(V2X) BSR indicating that information associated with the data of all buffers is not included is "10110", but the LCD value of Truncated SL(V2X) BSR indicating duplicated packet transmission is activated may be "10010", as shown in Table 5.

According to another aspect of the present disclosure, when the UE deactivates duplicated packet transmission, the UE may transmit, to the eNB, an SL BSR using an LCD indicating a normal SL(V2X) BSR/normal Truncated SL(V2X) BSR, thereby indicating that the duplicated packet transmission is deactivated.

Figure 12:
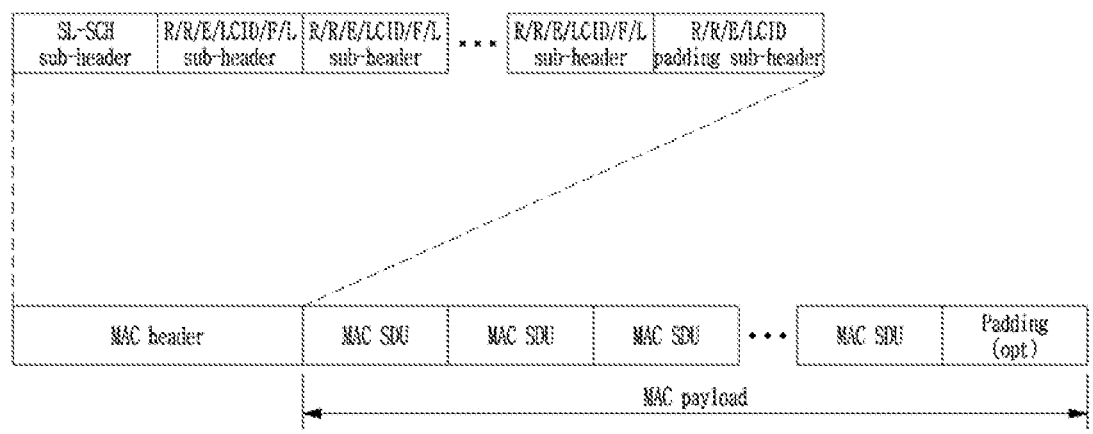
FIG. 12 is a diagram illustrating a MAC protocol data unit (PDU) format.

According to another aspect of the present disclosure, when all the serving cells (or carriers) on which duplicated packet transmission is activated are configured to operate in mode 3, UE1 transmits autonomously determined activation information of duplicated packet transmission (or activation/deactivation information of duplicated packet transmission) to the eNB in the form of MAC data (hereinafter referred to as packet duplication activation MAC data, or packet duplication deactivation MAC data, or packet duplication activation/deactivation MAC data) in operation S1135. The packet duplication activation MAC data may be included in a MAC protocol data unit (PDU) as shown in FIG. 12. For example, the packet duplication activation MAC data may be a MAC CE or a MAC SDU corresponding to a predetermined LCD. The payload for the packet duplication activation MAC data is not configured, and only a sub-header including an LCID may be configured.

According to an aspect of the present disclosure, when the UE activates duplicated packet transmission, the predetermined LCID value may be allocated as a value indicating packet duplication activation MAC data. For example, the predetermined LCID value may be 5 bits or 6 bits. The length of an LCID is different depending on a system that supports a V2X service. When the predetermined LCID is 5 bits, the LCID value, for example, is used in only the sub-header in an UL MAC PDU, and may have a value of "10011". When the predetermined LCID is 6 bits, the LCID value, for example, is used in only the sub-header in an UL MAC PDU, and may have a value of "110011".

According to another aspect of the present disclosure, when the UE deactivates duplicated packet transmission, the predetermined LCID value may be allocated as a value indicating packet duplication deactivation MAC data. For example, the predetermined LCID value may be 5 bits or 6 bits. When the predetermined LCID is 5 bits, the LCID value, for example, is used in only the sub-header in an UL MAC PDU, and may have a value of "10010". When the predetermined LCID is 6 bits, the LCID value, for example, is used in only the sub-header in an UL MAC PDU, and may have a value of "110010".

Referring again to FIG. 11, when the eNB receives the packet duplication activation MAC data in operation S1135 or receives an SL (or V2X) BSR related to duplicated packet transmission in operation S1130 from UE 1, the eNB may allocate a radio resource on a subframe, a transmission time interval (TTI), or a PSSCH transmission interval existing at the same point in time, with respect to different serving cells which are capable of performing transmission via sidelink CA in operation S1140.

In operation S1145, UE 1 performs SL duplicated packet transmission with respect to UE 2 using the radio resource allocated in operation S1140.

2. Second Embodiment that Performs Duplicated Packet Transmission when a UE Operates in Mode 4

Figure 13:
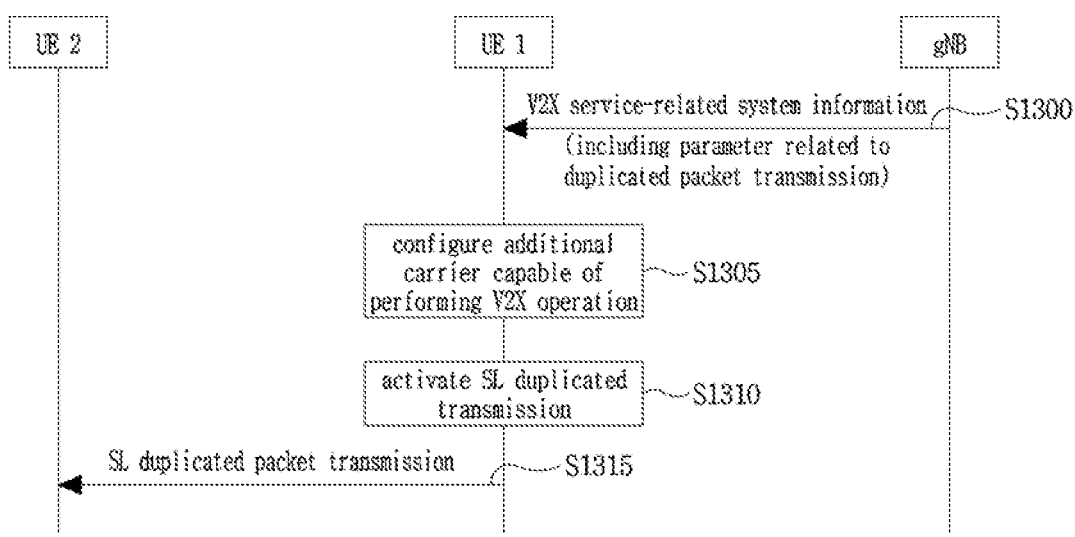
FIG. 13 is a flowchart illustrating a method of performing duplicated packet transmission in sidelink CA according to another embodiment.

FIG. 13 is a flowchart illustrating a method of performing duplicated packet transmission in sidelink CA according to another embodiment.

Referring to FIG. 13, an eNB transmits a parameter associated with duplicated packet transmission to UE 1 in operation S1300.

UEs that operate in mode 4 may be divided based on two RRC states, that is, an RRC connected state and RRC IDLE state. Therefore, a parameter associated with duplicated packet transmission is transmitted to a UE via a message format which is different based on an RRC state.

For example, the eNB transmits V2X service-related system information including a parameter associated with duplicated packet transmission to UE 1 in operation S1300. In this instance, UE 1 may belong to the RRC IDLE state. The V2X service-related system information may further include mode information, transmission resource pool information, and the like, in addition to a parameter associated with duplicated packet transmission.

As another example, the eNB transmits an RRC message including a parameter associated with duplicated packet transmission to UE 1. In this instance, UE 1 may belong to the RRC connected state. The RRC message may be an RRC connection reconfiguration message. The RRC message may further include mode information, transmission resource pool information, and the like, in addition to a parameter associated with duplicated packet transmission.

The parameter associated with the duplicated packet transmission may include an allow indicator indicating whether to allow sidelink duplicated packet transmission. For example, information indicating whether to allow the sidelink duplicated packet transmission may indicate permission or non-permission, using one bit (allow indicator=1 or 0). That is, the eNB may indicate whether UE 1 in mode 4 is capable of performing a duplicated V2X packet transmission scheme, via an RRC message.

When sidelink duplicated packet transmission is permitted (i.e., allow indicator=1), the parameter associated with duplicated packet transmission may further include information associated with an activation condition of duplicated packet transmission.

According to an aspect of the present disclosure, the information associated with the activation condition may include an allow cell indication information indicating a predetermined frequency band or serving cell that allows duplicated packet transmission. The eNB may confine duplicated packet transmission to the predetermined frequency band or serving cell using the allow cell indication information. That is to preemptively prevent an increase in the load of radio resources in the predetermined frequency band or serving cell, which may occur when duplicated packet transmission of UE 1 is activated. The information associated with the activation condition may be defined as information associated with a carrier or a serving cell on which duplicated packet transmission is not allowed. When allow cell indication information does not exist, it is agreed, in advance, between the UE and the eNB that duplicated packet transmission is not allowed on all carriers or serving cells capable of performing sidelink transmission. When the information associated with the activation condition is transmitted via the V2X service-related system information, the information associated with the activation condition may indicate whether duplicated transmission is allowed on a carrier or a serving cell on which the V2X service-related system information is transmitted.

According to another aspect of the present disclosure, the information associated with the activation condition may include a channel busy rate (CBR) value. The CBR value may be independently configured for each carrier (or serving cell) on which duplicated packet transmission is allowed. The CBR value may be set to have a value in the range between 0 and 1, for example, 0.1, 0.2, 0.3, . . . , and 0.9. When a carrier (or a serving cell) of which the CBR value is less than or equal to a threshold value may be a carrier or serving cell that performs duplicated packet transmission. Here, the CBR value may be defined by a value corresponding to the final value obtained by applying an offset value provided from the eNB and the received signal strength indicator (RSSI) value of a sidelink. When a CBR value is transmitted via the V2X service-related system information, the V2X service-related system information may include only a CBR value associated with a carrier or a serving cell on which the V2X service-related system information is transmitted.

The fact that the RSSI value is high indicates that other UEs are transmitting signals via a corresponding channel. Therefore, that fact indicates that the corresponding channel is frequently used by other UEs. Accordingly, UE 1 may have difficulty in maintaining reception reliability due to inter-signal interference when transmitting a corresponding packet. Therefore, UE 1 may consider activating duplicated packet transmission in order to increase the reception reliability.

When the threshold value of the CBR, which is the information associated with the activation condition, is greater than or equal to a threshold value, UE 1 may activate duplicated packet transmission on a carrier (or serving cell) on which duplicated packet transmission is allowed. The threshold value may be defined by a value of which the RSSI value of a channel compared to reliability, which is required by a packet to be transmitted, is not relatively high. In this instance, the reception reliability of the corresponding packet has no problem even though duplicated packet transmission is not performed via the corresponding channel.

For the CBR value which is information associated with the activation condition, two threshold values may be defined. One of which is "maximum threshold value" that indicates the case in which the RSSI value of a channel is high and a corresponding carrier (or serving cell) is frequently used by other users, and indicates a predetermined threshold value used for the condition that limits the above-described CBR value to the predetermined threshold value or less. The other of which is "minimum threshold value" to indicate that the RSSI value of the channel is significantly low and the reception reliability of a corresponding packet has no problem even though duplicated packet transmission is not performed via the corresponding channel. Therefore, the activation condition may be defined by a CBR value that is greater than or equal to the minimum threshold value and less than or equal to the maximum threshold value, based on the two threshold values.

According to another aspect of the present disclosure, the information associated with the activation condition may include a PPPP value that requires duplicated packet transmission. That is, the eNB provides, to UE1, the PPPP value which requires duplicated packet transmission from among data that UE 1 is to transmit via a sidelink. The PPPP value may have a total of 8 values (natural numbers in the range from 1 to 8). When the data that UE 1 is to transmit does not correspond to the PPPP value, UE 1 may not activate duplicated packet transmission. Conversely, when the data that UE 1 is to transmit corresponds to the PPPP value, UE 1 may activate duplicated packet transmission. When a PPPP value is transmitted via V2X service-related system information, the V2X service-related system information may include only a PPPP value associated with a carrier or a serving cell on which the V2X service-related system information is transmitted.

Here, a new parameter indicating the reliability of a corresponding packet may be provided instead of the PPPP value which is the information associated with the activation condition. The PPPP value may be determined by taking into consideration various QoS related parameters, such as the minimum required reliability of a corresponding packet, minimum required delay time, a service type, or the like. However, the new parameter may be defined by taking into consideration only the minimum required reliability or may be defined by additionally taking into consideration the delay time. Therefore, although the PPPP values are the same, new parameter values may be different from each other, or although the PPPP values are different from each other, new parameter values may be the same. The new parameter may be referred to as "packet reliability parameter". The new parameter may have a value which is distinguished by 8 levels from 0 to 7, or may be a value which is distinguished by 16 levels from 0 to 15.

The operations performed after UE 1 receives the parameter associated with duplicated packet transmission in operation S1300 are as follows. When at least two frequency bands and/or serving cells exist, on which UE 1 is capable of performing duplicated packet transmission, UE 1 additionally configure the corresponding frequency bands and/or serving cells in operation S1305, and may activate duplicated packet transmission based on the parameter associated with duplicated packet transmission in operation S1310. For example, when UE 1 determines activation of duplicated packet transmission, UE 1 may select a serving cell in mode 4, at least two carriers operable in mode 4, or a serving cell set in mode 4 and a carrier operable in mode 4.

UE 1 selects a radio resource for duplicated packet transmission based on transmission resource pool information of each serving cell or carrier obtained from the V2X service-related system information in operation S1300.

The radio resource which is selectable for duplicated packet transmission may be configured as a subframe, a Transmission Time interval (TTI), or a PSSCH transmission interval existing at the same point in time, among serving cells or carriers.

At least some resources in the transmission resource pools of serving cells (or carriers) in different modes do not correspond to the subframe, TTI, or PSSCH transmission interval at the same point in time, UE 1 may select a subframe, TTI, or PSSCH transmission interval existing in a time interval at which duplicated transmission is allowed. The time interval in which the duplicated transmission is allowed may be defined in advance. For example, the time interval may be set based on a delay time that is allowed while satisfying V2X service requirements.

According to an aspect of the present disclosure, the time interval may be configured by the eNB for each PPPP. Alternatively, the time interval may be configured as a fixed value for each UE. The eNB may determine a corresponding time interval value by taking into consideration the maximum allowed time delay of each V2X service, data load, or the like, and may configure the same for each UE.

According to another aspect of the present disclosure, the time interval may be fixedly configured for each PPPP. In this instance, a fixed time interval is determined by taking into consideration only the maximum allowed delay time of a V2X service, and information thereof is included in V2X preconfigured information of UE 1 and is stored in an embedded memory of the UE 1.

UE 1 performs SL duplicated packet transmission with respect to UE 2 in operation S1315.

Figure 14:
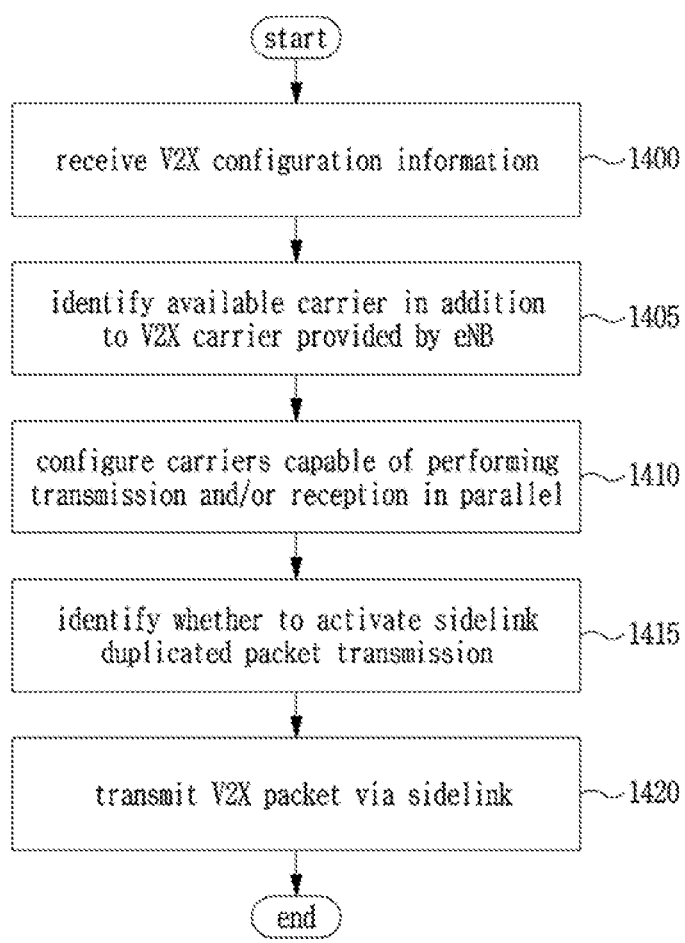
FIG. 14 is a flowchart illustrating the operation of a UE according to an embodiment of the present disclosure.

FIG. 14 is a flowchart illustrating the operation of a UE according to an embodiment of the present disclosure.

Referring to FIG. 14, a UE receives V2X dedicated configuration information or V2X common configuration information from an eNB in operation S1400. The V2X dedicated configuration information and V2X common configuration information may be information which is transmitted and received between a UE and an eNB. The information V2X dedicated configuration information and the V2X common configuration information may respectively include the functions and configurations according to all of the embodiments of V2X dedicated configuration information and V2X common configuration, which have been described with reference to FIGS. 1 to 13.

The UE identifies a V2X carrier or serving cell provided by the eNB, based on the V2X dedicated configuration information or V2X common configuration information received from the eNB. The UE may identify whether a usable carrier or serving cell exists, in addition to the V2X carrier or serving cell provided by the eNB, in operation S1405.

The UE configures carriers or serving cells which are capable of performing transmission and/or reception in parallel, according to each of the embodiments disclosed in "II. Duplicated packet transmission method in sidelink CA", or a combination thereof, in operation S1410.

The UE determines whether to activate sidelink duplicated packet transmission according to each of the embodiments disclosed in "II. Duplicated packet transmission method in sidelink CA", or a combination thereof, in operation S1415.

The UE transmits a V2X packet to another device via a sidelink according to sidelink CA and/or a duplicated packet transmission procedure and operation method thereof in sidelink CA which is determined according to each of the embodiments disclosed in "II. Duplicated packet transmission method in sidelink CA", or a combination thereof, in operation S1420.

Figure 15:
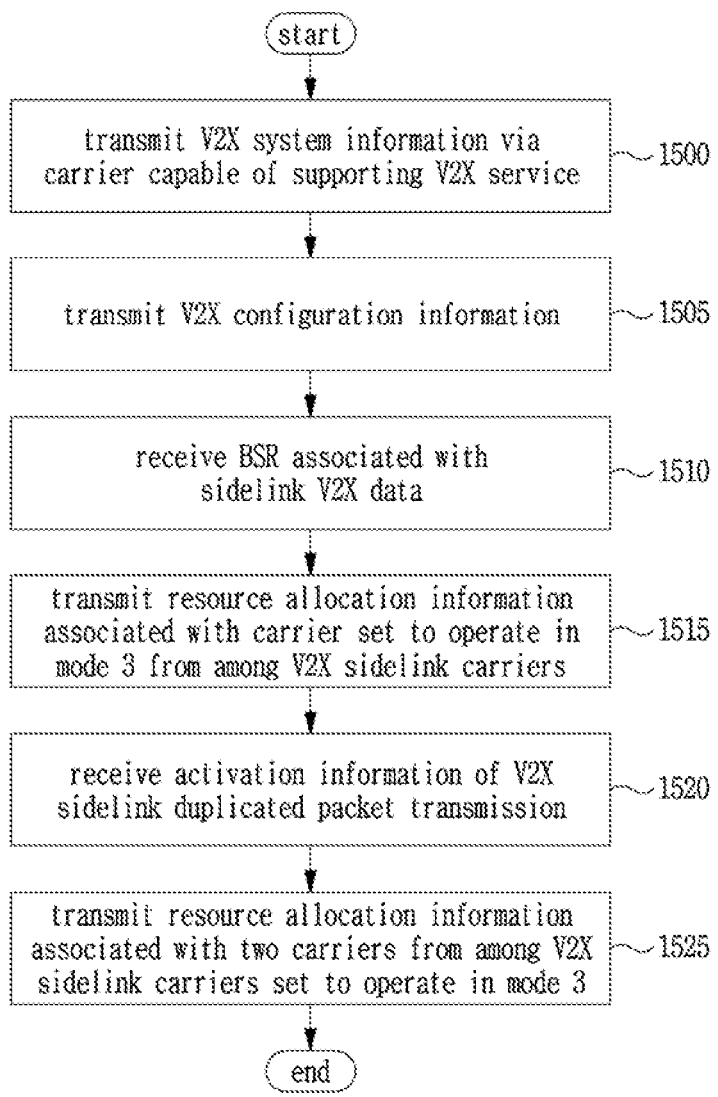
FIG. 15 is a flowchart illustrating the operation of an eNB according to an embodiment of the present disclosure.

FIG. 15 is a flowchart illustrating the operation of an eNB according to an embodiment of the present disclosure.

Referring to FIG. 15, an eNB transmits V2X common configuration information to a UE via a carrier or a serving cell that is capable of supporting a V2X service in operation S1500. The V2X common configuration information may be information, which includes the functions and configurations according to all of the embodiments of V2X common configuration which have been described with reference to FIGS. 1 to 13, and which is transmitted and received between a UE and an eNB.

The eNB transmits V2X dedicated configuration information to the UE in operation S1505. The V2X dedicated configuration information may be information, which includes the functions and configurations according to all of the embodiments of V2X dedicated configuration which have been described with reference to FIGS. 1 to 13, and which is transmitted and received between a UE and an eNB.

The eNB receives a BSR associated with sidelink V2X data from the UE in operation S1510.

The eNB transmits, to the UE, resource allocation information associated with a carrier or serving cell configured to operate in mode 3 from among sidelink V2X carriers or serving cells in operation S1515.

The eNB receives activation information of duplicated packet transmission from the UE in operation S1520.

The eNB transmits, to the UE, resource allocation information associated with two serving cells or carriers from among serving cells or carriers configured to operate in mode 3 in operation S1525.

A first wireless device (e.g., a UE or a V2X device) may receive, from an evolved NodeB (eNB), configuration information associated a packet duplication transmission between wireless devices. The configuration information may include a packet reliability parameter associated with activation of the packet duplication transmission between wireless devices. The first wireless device may determine a data packet to be transmitted to a second wireless device, and duplicates, based on determining the data packet satisfies the packet reliability parameter, the data packet to a plurality of data duplicates. The first wireless device may map the plurality of data duplicates onto different logical channels in a media access channel (MAC) layer, and transmit, via a direct communication to a second wireless device, the plurality of data duplicates mapped onto different logical channels.

The first wireless device may configure, based on a message from the eNB, a plurality of carriers for the first wireless device. The first wireless device may receive, from the eNB, information indicating a transmission resource pool for a direct communication between wireless devices. The first wireless may transmit, via a first carrier associated with a first logical channel, a first duplicate of the plurality of data duplicates, and transmit, via a second carrier associated with a second logical channel, a second duplicate of the plurality of data duplicates.

The configuration information may include information indicating one or more frequency bands in which a packet duplication is allowed. The first wireless device may determine, based on the information indicating one or more frequency bands in which a packet duplication is allowed, the first carrier and the second carrier.

The configuration information may include information indicating one or more serving cells for which a packet duplication is allowed. The first wireless device may determine, based on the information indicating one or more serving cells for which a packet duplication is allowed, serving cells to transmit the plurality of data duplicates mapped onto different logical channels.

The plurality of data duplicates may include a plurality of duplicated Packet Data Convergence Protocol (PDCP) packet data units. In the first wireless device, one or more processors may send, from a PDCP entity and to different Radio Link Control (RLC) entities, the plurality of duplicated PDCP packet data units. The different RLC entities may be associated with the different logical channels in the MAC layer. The plurality of data duplicates may be associated with a same sequence number. The sequence number may indicate a position of a particular data packet in a sequence of data packets. The packet reliability parameter may indicate one of a range of integer values (e.g., one of eight integer values).

Each of the different logical channels may be assigned to one or more logical channel groups, and the one or more logical channel groups may be associated with the packet reliability parameter. For example, as explained above, mapping information between a logical channel group and a PPPP value or a packet reliability parameter value may be indicated to the first wireless device from an evolved NodeB.

The second wireless device may receive, via a direct communication from the first wireless device, a plurality of data duplicates mapped onto different logical channels. The second wireless device may determine, based on the different logical channels, the plurality of data duplicates, wherein the plurality of data duplicates are associated with a same sequence number. The second wireless device may store, based on the same sequence number, one of the plurality of data duplicates. The second wireless device may discard, after the storing, remaining data duplicates of the plurality of data duplicates.

The second wireless device may configure, based on a message from an eNB, a plurality of carriers. The second wireless device may receive, via a first carrier associated with a first logical channel, a first duplicate of the plurality of data duplicates, and receive, via a second carrier associated with a second logical channel, a second duplicate of the plurality of data duplicates.

The second wireless device may receive configuration information similar to the configuration information received by the first wireless device. The eNB communicating with the second wireless device may generate the configuration information customized for the second wireless device in view of various capabilities, characteristics, wireless environment associated with the second wireless device.

Figure 16:
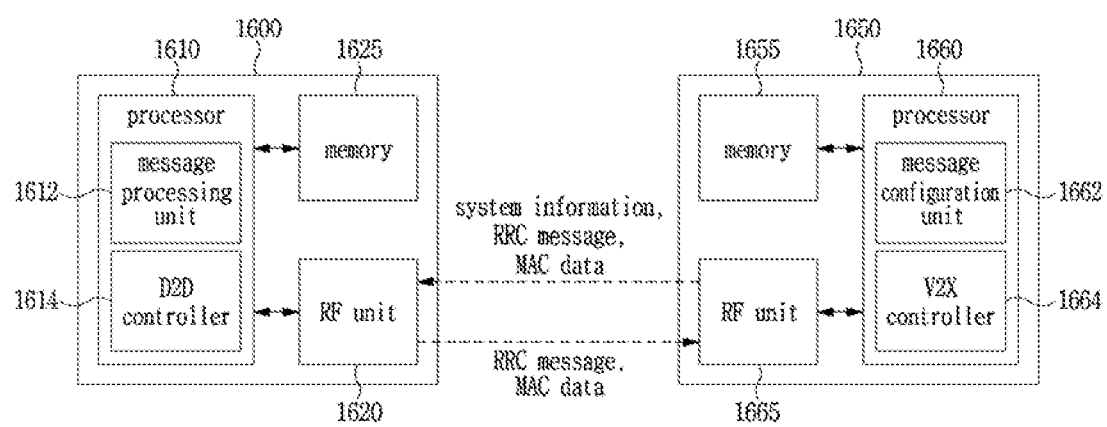
FIG. 16 is a block diagram illustrating a UE and an eNB according to an embodiment of the present invention.

FIG. 16 is a block diagram illustrating a UE and an eNB according to an embodiment of the present invention.

Referring to FIG. 16, a UE 1600 includes a processor 1610, a memory 1625, and an RF unit 1620. The processor 1610 may include a message processing unit 1612 and a V2X controller 1614.

The processor 1610 may implement the functions, processes, and/or methods proposed in the present specification. Particularly, the processor 1610 implements all of the operations of a UE which have been described in the embodiments disclosed in the present specification, and may generate and control data, control information, or both data and control information according to FIGS. 1 to 15. The memory 1625 is connected to the processor 1610, and stores various pieces of information for driving the processor 1610. The operations of the message processing unit 1612 and the V2X controller 1614 belong to the operation of the processor 1610.

The RF unit 1620 is connected to the processor 1610, and transmits and/or receives a radio signal. For example, the RF unit 1620 may transmit control information, data, or both control information and data to the eNB 1650, or may receive control information, data, or both control information and data from the eNB 1650.

The RF unit 1620 may receive V2X service-related system information, an RRC message, and MAC data disclosed in the present specification. Particularly, the RF unit 1620 may receive V2X dedicated configuration information or V2X common configuration information from the eNB 1600. The V2X dedicated configuration information and V2X common configuration information may respectively include the functions and configurations according to all of the embodiments of V2X dedicated configuration information and V2X common configuration, which have been described with reference to FIGS. 1 to 13.

The message processing unit 1612 may restore and/or decode V2X service-related system information, RRC message, MAC data, and transfer the restored information to the V2X controller 1614. Alternatively, the message processing unit 1612 generates all RRC messages or MAC data transmitted from the UE 1600 to the eNB 1650 as described in the present specification, and transmits the same to the RF unit 1620. The RF unit 1620 transmits the RRC messages or MAC data to the eNB 1650.

For example, the message processing unit 1612 generates activation information of duplicated packet transmission, and transmits the same to the RF unit 1620. The RF unit 1620 transmits the activation information of the duplicated packet transmission to the eNB 1650.

The V2X controller 1614 controls and performs all V2X related operations of the UE 1600 disclosed in the present specification, based on received information.

For example, the V2X controller 1614 identifies a V2X carrier or serving cell provided by the eNB 1650, based on V2X dedicated configuration information or V2X common configuration information received from the eNB 1650. In addition, the V2X controller 1614 identifies whether a carrier or serving cell that is operable exists, in addition to the V2X carrier or serving cell provided by the eNB 1650. The V2X controller 1614 identifies whether to activate sidelink duplicated packet transmission, according to each of the embodiments disclosed in "II. Duplicated packet transmission method in sidelink CA" of the present specification, or a combination thereof. The V2X controller 1614 transmits a V2X packet to another device via a sidelink according to sidelink CA and/or a duplicated packet transmission procedure and an operation method thereof in sidelink CA which is determined according to each of the embodiments disclosed in I and II, or a combination thereof.

Subsequently, the eNB 1650 includes a memory 1655, a processor 1660, and an RF unit 1665. The processor 1660 may include a message configuration unit 1662 and a V2X controller 1664.

Particularly, the processor 1660 implements all of the operations of an eNB which have been described in the embodiments provided in the present specifications, and may generate and control data, control information, or both data and control information according to FIGS. 1 to 15. The memory 1655 is connected to the processor 1660, and stores various pieces of information for driving the processor 1660. The operations of the message configuration unit 1662 and the V2X controller 1664 belong to the operation of the processor 1660.

The RF unit 1665 is connected to the processor 1660, and transmits and/or receives a radio signal. For example, the RF unit 1665 may transmit control information, data, or both control information and data to the eNB 1600, or may receive control information, data, or both control information and data from the eNB 1600.

Each method implemented in the above-described system has been described via a flowchart including a series of operations or blocks. However, the present disclosure is not limited to the order of operations, and the operations may be performed in a different order or some operations may be performed in parallel. Also, those skilled in the art may understand that the operations in the flowchart are not exclusive, and another operation may be newly added or one or more operations in the flowchart may be deleted without affecting the scope of the present disclosure.

The above-described embodiments include various examples showing various aspects. Although it is difficult to describe all the possible combinations showing the various aspects, it is apparent to those skilled in the art that other combinations are possible. Therefore, it should be construed that the present disclosure includes other substitutions, corrections, and modifications belonging to the scope of claims.

What is claimed is:

1. A method comprising:
receiving, by a first wireless device from an evolved NodeB (eNB), configuration information associated with a packet duplication transmission between wireless devices, wherein the configuration information comprises information indicating a mapping between a logical channel group and a packet reliability parameter, wherein the packet reliability parameter is used to determine, by the first wireless device, activation of the packet duplication transmission between wireless devices and indicates a value selected from a plurality of configured values, and wherein the plurality of configured values comprises eight integer values each indicating a different reliability requirement;
determining a data packet to be transmitted to a second wireless device;
duplicating, based on the data packet associated with the packet reliability parameter, the data packet to a plurality of data duplicates;
mapping the plurality of data duplicates onto different logical channels in a media access control (MAC) layer; and
transmitting, by the first wireless device and via a direct communication to the second wireless device, the plurality of data duplicates mapped onto the different logical channels.

2. The method of claim 1, further comprising:
configuring, by the first wireless device and based on a message from the eNB, a plurality of carriers for the first wireless device; and
receiving, from the eNB, information indicating a transmission resource pool for direct communication between wireless devices,
wherein the transmitting the plurality of data duplicates comprises:
- transmitting, via a first carrier associated with a first logical channel, a first duplicate of the plurality of data duplicates; and
- transmitting, via a second carrier associated with a second logical channel, a second duplicate of the plurality of data duplicates.

3. The method of claim 2, wherein the configuration information further comprises information indicating one or more frequency bands in which a packet duplication is allowed.

4. The method of claim 3, further comprising:
determining, based on the information indicating one or more frequency bands in which a packet duplication is allowed, the first carrier and the second carrier.

5. The method of claim 1, wherein the configuration information further comprises information indicating one or more serving cells for which a packet duplication is allowed.

6. The method of claim 5, further comprising:
determining, based on the information indicating one or more serving cells for which a packet duplication is allowed, serving cells to transmit the plurality of data duplicates mapped onto the different logical channels.

7. The method of claim 1, wherein the plurality of data duplicates comprise a plurality of duplicated Packet Data Convergence Protocol (PDCP) packet data units.

8. The method of claim 7, further comprising:
sending, from a PDCP entity and to different Radio Link Control (RLC) entities, the plurality of duplicated PDCP packet data units,
wherein the different RLC entities are associated with the different logical channels in the MAC layer.

9. The method of claim 1, wherein the plurality of data duplicates are associated with a same sequence number.

10. The method of claim 1, wherein each of the different logical channels is associated with one or more logical channel groups, and the one or more logical channel groups is associated with the packet reliability parameter.

11. A method comprising:
receiving, by a first wireless device from an evolved NodeB (eNB), configuration information associated with a packet duplication transmission between wireless devices, wherein the configuration information comprises information indicating a mapping between a logical channel group and a packet reliability parameter, wherein the packet reliability parameter is used to determine, by the first wireless device, activation of the packet duplication transmission between wireless devices and indicates a value selected from a plurality of configured values, and wherein the plurality of configured values comprises eight integer values each indicating a different reliability requirement;
receiving, via a direct communication from a second wireless device, a plurality of data duplicates mapped onto different logical channels;
determining, based on the different logical channels, the plurality of data duplicates, wherein the plurality of data duplicates are associated with a same sequence number;
storing, based on the same sequence number, one of the plurality of data duplicates; and
discarding, after the storing, remaining data duplicates of the plurality of data duplicates.

12. The method of claim 11, further comprising:
configuring, by the first wireless device and based on a message from the eNB, a plurality of carriers for the first wireless device,
wherein the receiving the plurality of data duplicates comprises:
- receiving, via a first carrier associated with a first logical channel, a first duplicate of the plurality of data duplicates; and
- receiving, via a second carrier associated with a second logical channel, a second duplicate of the plurality of data duplicates.

13. The method of claim 12, wherein the configuration information further comprises information indicating one or more frequency bands in which a packet duplication is allowed.

14. The method of claim 13, further comprising:
determining, based on the information indicating one or more frequency bands in which a packet duplication is allowed, the first carrier and the second carrier.

15. The method of claim 11, wherein the configuration information further comprises information indicating one or more serving cells for which a packet duplication is allowed.

16. The method of claim 15, further comprising:
determining, based on the information indicating one or more serving cells for which a packet duplication is allowed, serving cells to receive the plurality of data duplicates mapped onto the different logical channels.

17. The method of claim 11, wherein the plurality of data duplicates comprise a plurality of duplicated Packet Data Convergence Protocol (PDCP) packet data units.

18. The method of claim 17, further comprising:
determining, by a PDCP entity and based on data from different Radio Link Control (RLC) entities, the plurality of duplicated PDCP packet data units,
wherein the different RLC entities are associated with the different logical channels in a media access control (MAC) layer.

19. The method of claim 11, wherein each of the different logical channels is associated with one or more logical channel groups, and the one or more logical channel groups is associated with the packet reliability parameter.

20. The method of claim 1, further comprising determining, by the first wireless device and based on one or more frequency bands for duplicated packet transmission, one or more resources for duplicate packet transmission,
wherein the configuration information indicates the one or more frequency bands for duplicated packet transmission.

21. The method of claim 1, wherein the configuration information further comprises information indicating a mapping between the logical channel group and a packet priority parameter.

22. The method of claim 21, wherein the packet priority parameter comprises a priority per prose packet (PPPP).

23. The method of claim 11, wherein the configuration information further comprises information indicating a mapping between the logical channel group and a packet priority parameter, and
wherein the packet priority parameter comprises a priority per prose packet (PPPP).

* * * * *